United States Patent
Sharma

(10) Patent No.: US 12,413,522 B2
(45) Date of Patent: Sep. 9, 2025

(54) METHOD AND SYSTEM FOR OPTIMIZING INTERNAL NETWORK TRAFFIC IN KUBERNETES

(71) Applicant: Dell Products L.P., Round Rock, TX (US)

(72) Inventor: Mukesh Kumar Sharma, Pune (IN)

(73) Assignee: Dell Products L.P., Round Rock, TX (US)

( * ) Notice: Subject to any disclaimer, the term of this patent is extended or adjusted under 35 U.S.C. 154(b) by 167 days.

(21) Appl. No.: 18/541,168

(22) Filed: Dec. 15, 2023

(65) Prior Publication Data

US 2025/0202821 A1   Jun. 19, 2025

(51) Int. Cl.
*G06F 15/173* (2006.01)
*H04L 47/122* (2022.01)
*H04L 47/33* (2022.01)

(52) U.S. Cl.
CPC ............ *H04L 47/122* (2013.01); *H04L 47/33* (2013.01)

(58) Field of Classification Search
CPC .............................. H04L 47/122; H04L 47/33
See application file for complete search history.

(56) References Cited

U.S. PATENT DOCUMENTS

| | | | |
|---|---|---|---|
| 2023/0134096 A1* | 5/2023 | Boyapalle | G06N 20/00 718/105 |
| 2024/0250953 A1* | 7/2024 | Robison | H04L 63/20 |
| 2024/0354171 A1* | 10/2024 | Sethi | H04L 63/08 |
| 2024/0394149 A1* | 11/2024 | Ambaljeri | G06F 16/2358 |
| 2025/0097047 A1* | 3/2025 | Cai | H04L 47/122 |
| 2025/0202821 A1* | 6/2025 | Sharma | H04L 47/122 |
| 2025/0233872 A1* | 7/2025 | Gopalakrishna | H04L 63/1416 |

* cited by examiner

*Primary Examiner* — Phuoc H Nguyen
(74) *Attorney, Agent, or Firm* — Chamberlain, Hrdlicka, White, Williams & Aughtry; Aly Z. Dossa

(57) ABSTRACT

A method for managing network traffic includes: identifying, by a source pod, a port of a first service; in response to the identifying the port of the first service, connecting, by the source pod, to the port of the first service; receiving, by the source pod, a first notification from the first service, after the first notification: identifying, by the source pod, a port of a second service; in response to the identifying the port of the second service, connecting, by the source pod, to the port of the second service; receiving, by the source pod, a second notification from the second service; and upon receiving the second notification, sending, by the source pod, network traffic to the second service.

20 Claims, 9 Drawing Sheets

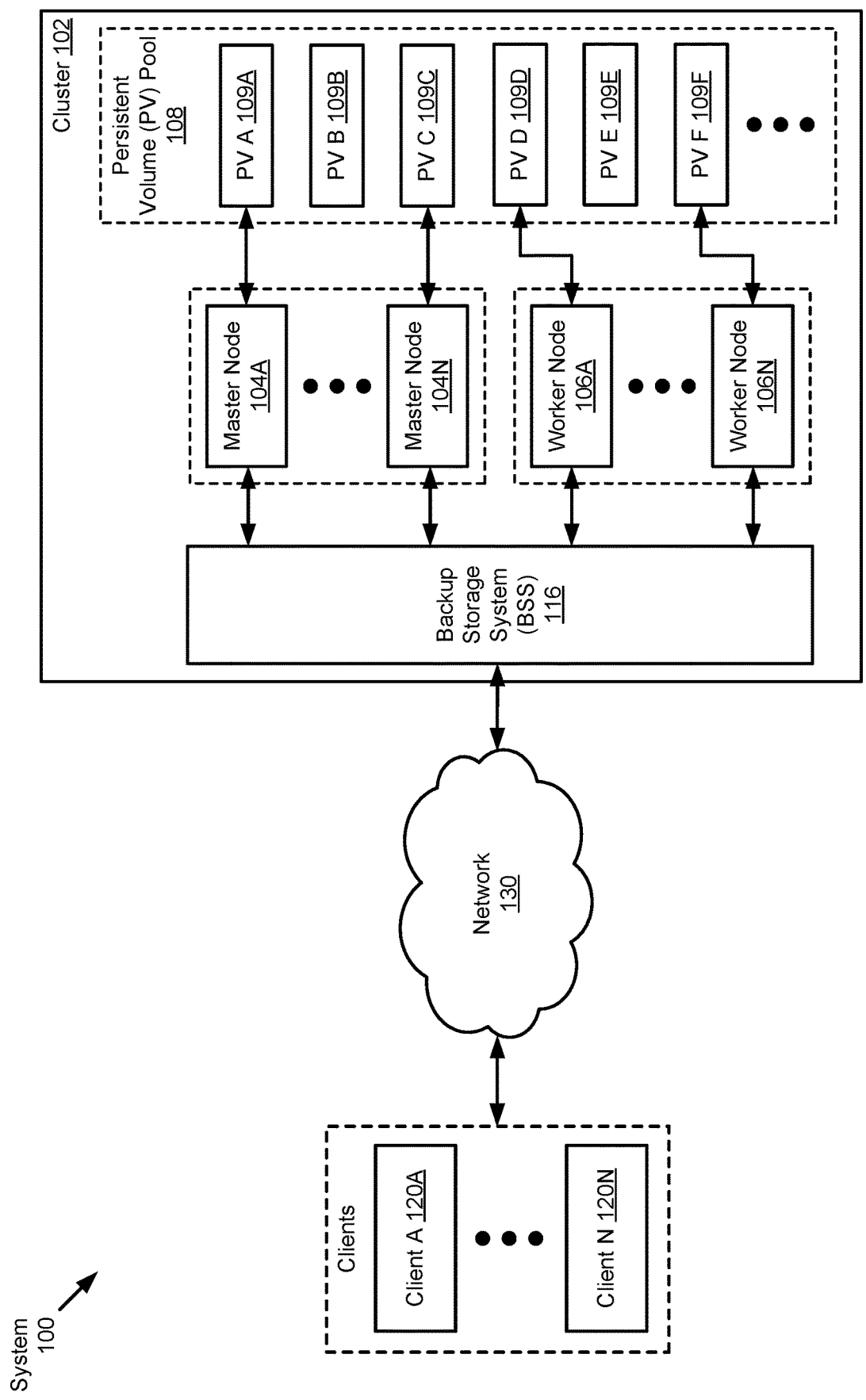
FIG. 1.1

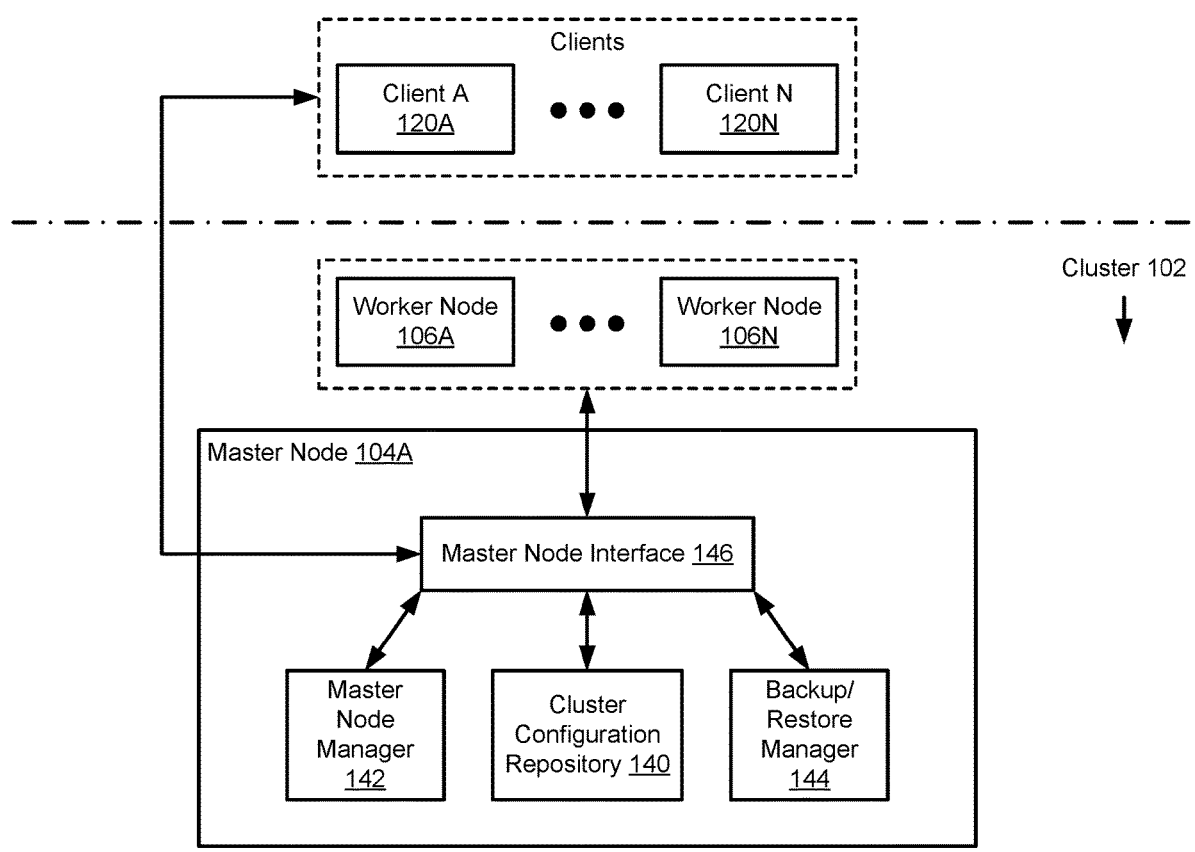
FIG. 1.2

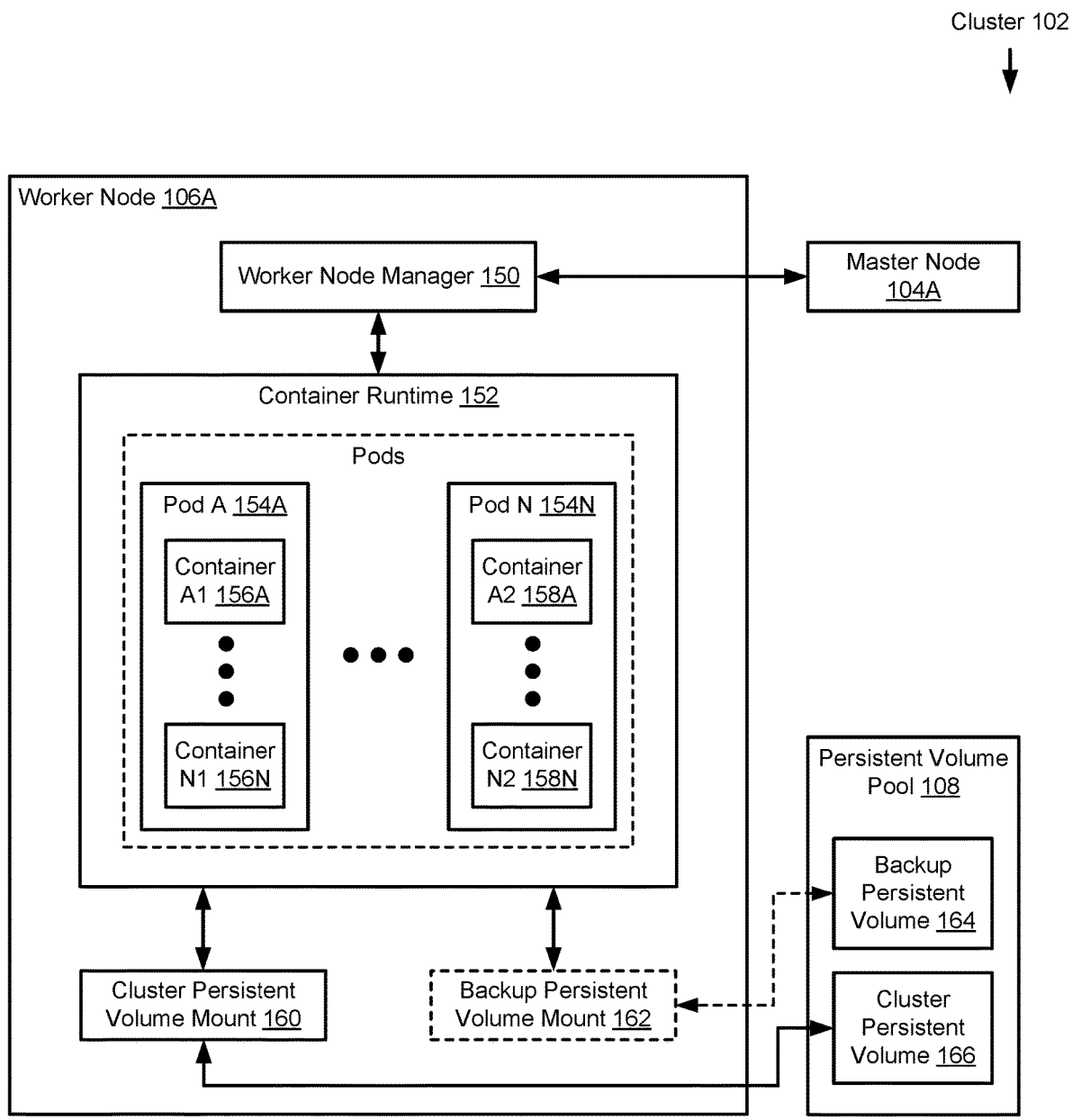
FIG. 1.3

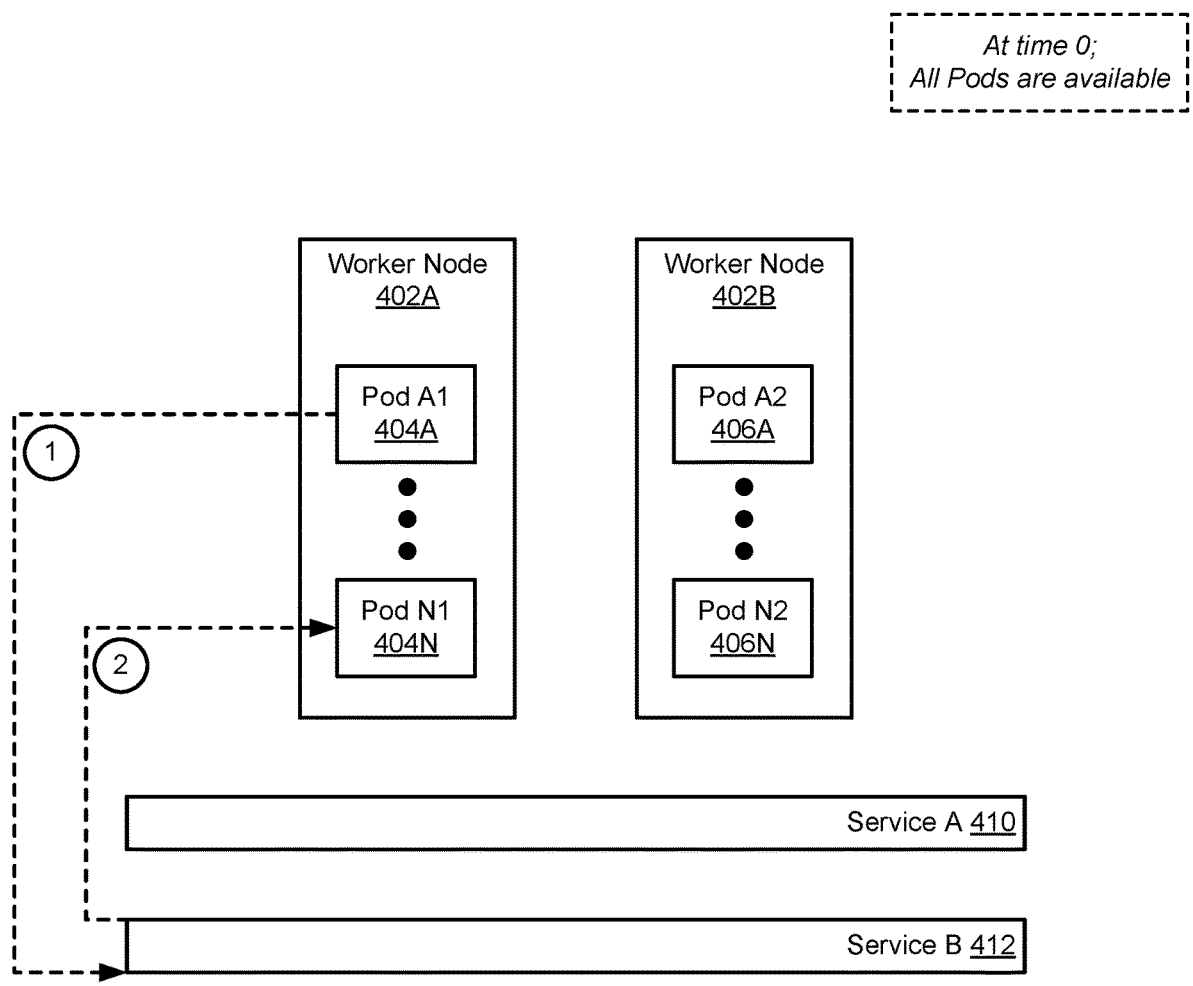
FIG. 4.1

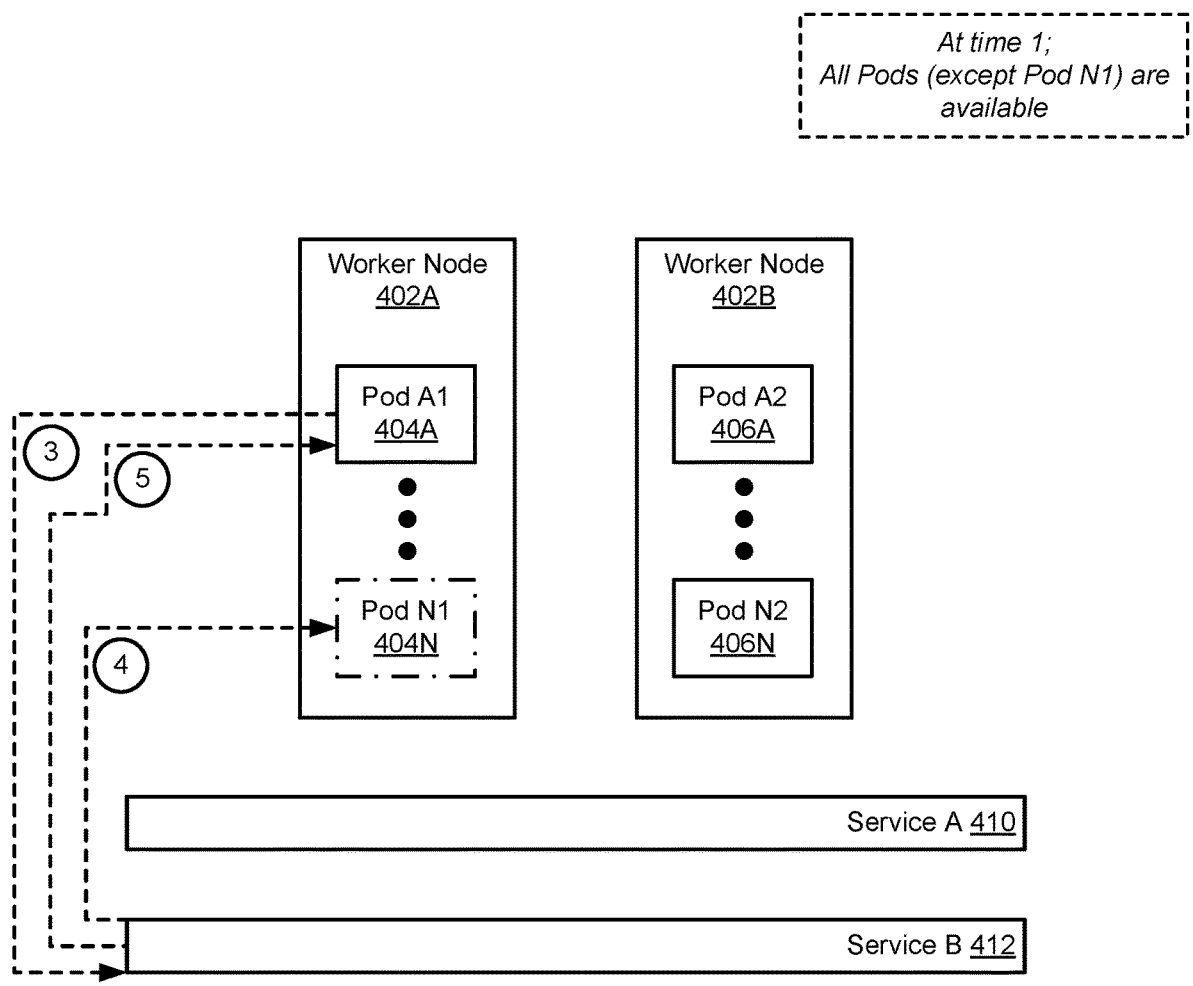
FIG. 4.2

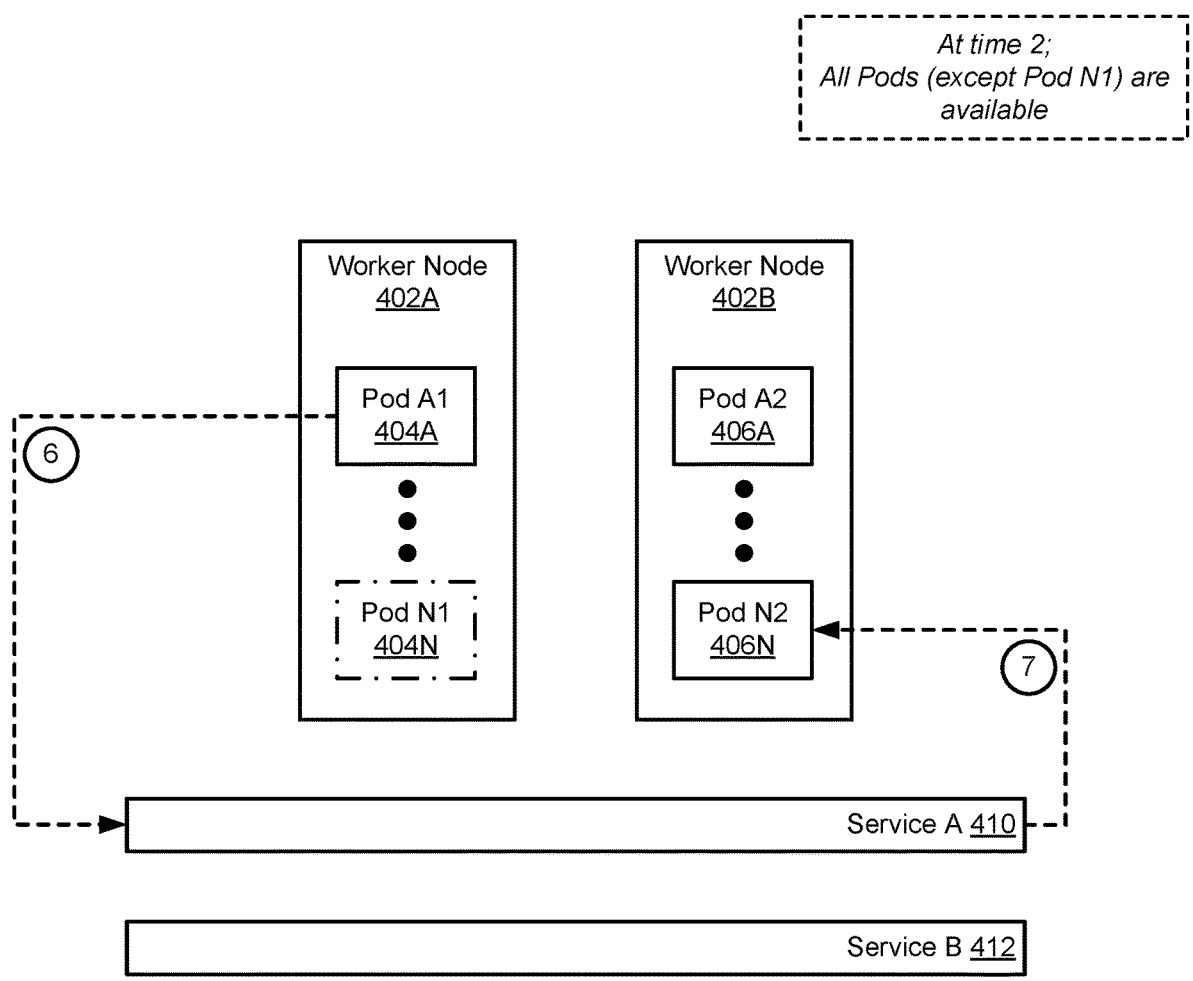
FIG. 4.3

METHOD AND SYSTEM FOR OPTIMIZING INTERNAL NETWORK TRAFFIC IN KUBERNETES

BACKGROUND

Devices and/or components of devices are often capable of performing certain functionalities that other devices and/or components are not configured to perform and/or are not capable of performing. In such scenarios, it may be desirable to adapt one or more systems to enhance the functionalities of devices and/or components that cannot perform the one or more functionalities.

BRIEF DESCRIPTION OF DRAWINGS

Certain embodiments of the invention will be described with reference to the accompanying drawings. However, the accompanying drawings illustrate only certain aspects or implementations of the invention by way of example, and are not meant to limit the scope of the claims.

FIG. 1.1 shows a diagram of a system in accordance with one or more embodiments of the invention.

FIG. 1.2 shows a diagram of a master node in accordance with one or more embodiments of the invention.

FIG. 1.3 shows a diagram of a worker node in accordance with one or more embodiments of the invention.

FIGS. 4.1-4.3 show an example use case in accordance with one or more embodiments of the invention.

DETAILED DESCRIPTION

Figure 2:
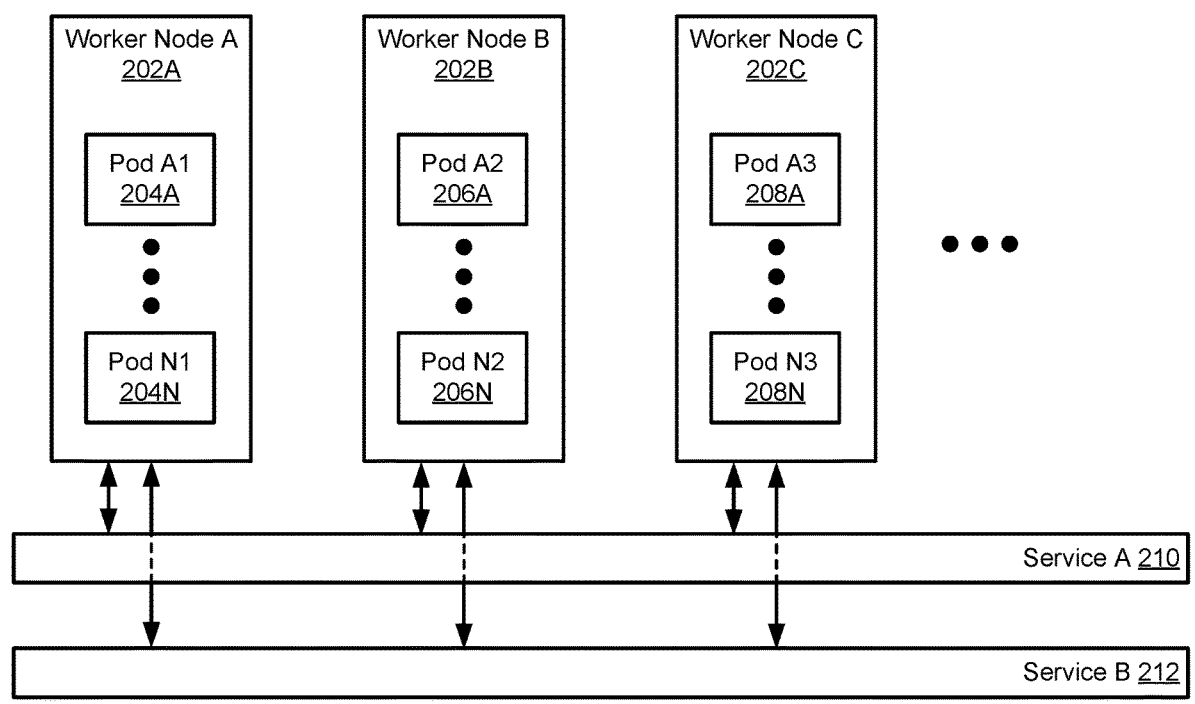
FIG. 2 shows a diagram of internal network traffic in a cluster in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that the one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase "operatively connected" may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, distributed data protection systems (or any other computing system/infrastructure) operate based on a Kubernetes cluster (e.g., a portable, extensible, and open-source platform for managing containerized workloads and/or services), in which the corresponding computing system may include various different sub-systems (e.g., worker nodes) that execute one or more pods. For example, Pod 1 may implement a dedupe engine that stores dedupe file system metadata (e.g., an identifier of an asset (e.g., a file, a folder, etc.), an identifier of a parent folder containing an asset, a size of an asset, one or more attributes of an asset, etc.) in Pod 2.

In most cases, a first pod (or a "source" pod) may need to send metadata and/or data to another pod according to one or more constraints, e.g.: (i) by default, the first pod sends metadata and/or data only to a second pod (e.g., a local "target" pod that executes on the same worker node (e.g., Node 1) as the first pod) to manage/optimize network data transfer(s) and associated latencies; and (ii) if the second pod is not available (or down), the first pod should be able to send metadata and/or data to a third pod (e.g., a remote pod that executes on a different/remote worker node (e.g., Node 2) to build resiliency in the corresponding computing system. However, as being one of the software-defined architecture principles, users (or administrators) may not want pods being aware of (i) local and/or remote nodes in a corresponding cluster (e.g., a Kubernetes cluster) and/or (ii) any other cluster-related information within another (local or remote) pod and/or node (so that users may move the corresponding cluster to another form factor, such as a cloud infrastructure, at a later point-in-time).

As a candidate solution/approach to the aforementioned problems/issues, a master node of a Kubernetes cluster may allow the generation of a service (a method for exposing an application that is executing as one or more pods in a given Kubernetes cluster) (e.g., Service 1) with one or more pods as being "target" endpoints. This may allow a "source" pod to send input/output (I/O) operations to a "target" pod, in which the Kubernetes cluster takes care of managing/redirecting I/O to any available target pod within the cluster. This approach is assumed as one of the most robust ways to handle the aforementioned issues; however, this approach is still inefficient/problematic with respect to network usage, as I/O operations/requests (received from a source pod) may be redirected/routed to any target pod (local or remote) in a given Kubernetes cluster, which degrades the Kubernetes cluster's performance.

As another candidate approach to the aforementioned issues, a master node of a Kubernetes cluster may allow setting up a local internal traffic policy (e.g., ".spec.internalTrafficPolicy: Local"), which may apply one or more internal traffic restrictions to direct/route internal network traffic only to target pods/endpoints within the corresponding node (where the traffic is originated from). However, this approach is still inefficient because when the local "target" pod is not available (e.g., offline, does not have enough computing resources to perform extra workload, etc.), then I/O operations (or internal network traffic) of the "source" pod will fail even if other target pods are available on remote worker nodes (of the Kubernetes cluster).

For at least the reasons discussed above and without requiring resource (e.g., time, engineering, etc.) intensive efforts, a fundamentally different approach is needed (e.g., an approach that provides advantages of the aforementioned approaches while eliminating disadvantages of the aforementioned approaches) to optimize internal network traffic, at least, among one or more pods hosted by one or more nodes (e.g., information handling systems (IHSs)) in a Kubernetes cluster.

Embodiments of the invention relate to methods and systems for managing internal network traffic in a (Kubernetes) cluster. As a result of the processes discussed below, one or more embodiments disclosed herein advantageously ensure that: (i) at least two services (e.g., Service A and Service B) are generated in (or deployed to) the cluster where, for example, Service B's internal traffic policy is set to "local" to route a source pod's internal traffic only to "local" target pods (e.g., to optimize network data transfer and associated latencies within the cluster); (ii) a smart and functional framework is deployed to a source pod such that, for any reason (e.g., the corresponding "local" target pod is down), if the source pod could not connect to Service B and perform I/O operations (or any other operation (e.g., sending metadata and/or data)) in conjunction with the local target pod, the source pod then switches to Service A to continue performing the I/O operations with a "remote" target pod that executes on a different worker node (e.g., to build resiliency/robustness within the cluster); (iii) each of the pods that executes on the cluster is not required to have (or be aware of) any infrastructure knowledge (e.g., local/remote pod placements/deployments (on the same/different nodes), pod affinity mechanisms, local/remote node deployments, node affinity mechanisms, etc., across the cluster) about the cluster (for a better user experience, for example, the user may move the cluster (or the pods) to another form factor (without having any resource contention and/or deployment issues) at a later point-in-time); (iv) at least the aforementioned inefficiencies (e.g., inefficient network usage, non-resiliency, inefficient internal network traffic routing, inefficient data transfer to any available pod, inefficient infrastructure abstraction (e.g., exposing the number of nodes in the cluster, exposing the number of pods in a node, exposing which node hosts which pods, etc.), being dependent on an underlying infrastructure (e.g., being aware of a newly deployed node, being aware of a node that is removed, etc.), etc.) of a given Kubernetes cluster are managed/minimized to optimize/increase the overall performance of the cluster (for example, by harnessing "InternalTrafficPolicy" feature that is already available in a given Kubernetes cluster); and/or (v) administrators do not need to invest most of their time and engineering efforts to manually manage internal network traffic for a better product management and development.

The following describes various embodiments of the invention.

FIG. 1.1 shows a diagram of a system (100) in accordance with one or more embodiments of the invention. The system (100) includes any number of clients (e.g., Client A (120A), Client B (120B), etc.), a cluster (102), a cluster storage system (CSS) (not shown), and a network (130). The system (100) may facilitate, at least, management and optimization of internal network traffic within the cluster (102). The system (100) may include additional, fewer, and/or different components without departing from the scope of the invention. Each component may be operably/operatively connected to any of the other components via any combination of wired and/or wireless connections. Each component illustrated in FIG. 1.1 is discussed below.

In one or more embodiments, the clients (e.g., 120A, 120B, etc.), the cluster (102), and the network (130) may be (or may include) physical hardware or logical devices, as discussed below. While FIG. 1.1 shows a specific configuration of the system (100), other configurations may be used without departing from the scope of the invention. For example, although the clients (e.g., 120A, 120B, etc.) and the cluster (102) are shown to be operatively connected through a communication network (e.g., 130), the clients (e.g., 120A, 120B, etc.) and the cluster (102) may be directly connected (e.g., without an intervening communication network).

Further, functioning of the clients (e.g., 120A, 120B, etc.) and the cluster (102) is not dependent upon the functioning and/or existence of the other components (e.g., devices) in the system (100). Rather, the clients and cluster may function independently and perform operations locally that do not require communication with other components. Accordingly, embodiments disclosed herein should not be limited to the configuration of components shown in FIG. 1.1.

As used herein, "communication" may refer to simple data passing, or may refer to two or more components coordinating a job. As used herein, the term "data" is intended to be broad in scope. In this manner, that term embraces, for example (but not limited to): data segments that are produced by data stream segmentation processes, data chunks, data blocks, atomic data, emails, objects of any type, files of any type (e.g., media files, spreadsheet files, database files, etc.), contacts, directories, sub-directories, volumes, etc.

In one or more embodiments, although terms such as "document", "file", "segment", "block", or "object" may be used by way of example, the principles of the present disclosure are not limited to any particular form of representing and storing data or other information. Rather, such principles are equally applicable to any object capable of representing information.

In one or more embodiments, the system (100) may be a distributed system (e.g., a data processing environment for processing data, a cloud computing infrastructure, etc.) and may deliver at least computing power (e.g., real-time network monitoring, server virtualization, etc.), storage capacity (e.g., data backup), and data protection (e.g., software-defined data protection, disaster recovery, etc.) as a service to users (e.g., end-users) of the clients (e.g., 120A, 120B, etc.). The system (100) may also represent a comprehensive middleware layer executing on computing devices (e.g., 500, FIG. 5) that supports virtualized application and storage environments. In one or more embodiments, the system (100) may support one or more virtual machine (VM) environments, and may map capacity requirements (e.g., computational load, storage access, etc.) of VMs and supported applications to available resources (e.g., processing resources, storage resources, etc.) managed by the environments. Further, the system (100) may be configured for workload placement collaboration and computing resource (e.g., processing, storage/memory, virtualization, networking, etc.) exchange.

To provide computer-implemented services to the users, the system (100) may perform some computations (e.g., data collection, distributed processing of collected data, etc.) locally (e.g., at the users' site using one or more clients (e.g., 120A, 120B, etc.)) and other computations remotely (e.g., away from the users' site using the cluster (102)) from the users. By doing so, the users may utilize different computing devices (e.g., 500, FIG. 5) that have different quantities of computing resources (e.g., processing cycles, memory, storage, etc.) while still being afforded a consistent user experience. For example, by performing some computations remotely, the system (100) (i) may maintain the consistent user experience provided by different computing devices even when the different computing devices possess different quantities of computing resources, and (ii) may process data more efficiently in a distributed manner by avoiding the overhead associated with data distribution and/or command and control via separate connections.

As used herein, "computing" refers to any operations that may be performed by a computer, including (but not limited to): computation, data storage, data retrieval, communications, etc. Further, as used herein, a "computing device" refers to any device in which a computing operation may be carried out. A computing device may be, for example (but not limited to): a compute component, a storage component, a network device, a telecommunications component, etc.

As used herein, a "resource" refers to any program, application, document, file, asset, executable program file, desktop environment, computing environment, or other resource made available to, for example, a user of a client (described below). The resource may be delivered to the client via, for example (but not limited to): conventional installation, a method for streaming, a VM executing on a remote computing device, execution from a removable storage device connected to the client (such as universal serial bus (USB) device), etc.

In one or more embodiments, the cluster (102) may be configured (i) for hosting any number of master nodes (e.g., 104A, 104B, etc.), any number of worker nodes (e.g., 106A, 106B, etc.), a backup storage system (BSS) (116), a persistent volume pool (108), a CSS plug-in (not shown), a BSS plug-in (not shown), (ii) for maintaining various workloads, and/or (iii) for providing a computing environment (e.g., computing power and storage) whereon workloads may be implemented (to provide computer-implemented services). In one or more embodiments, each component of the cluster (102) may be operably/operatively connected to any of the other components of the cluster (102) via any combination of wired and/or wireless connections.

Details of a master node (e.g., 104A) and a worker node (e.g., 106A) are described below in reference to FIGS. 1.2 and 1.3, respectively.

As being implemented as a physical computing device or a logical computing device and with the help of the hosted components, the CSS, and the BSS (116), the cluster (102) may include functionality to, e.g.: (i) operate as a reliable container orchestration platform (e.g., a Kubernetes platform that executes containers at scale for production workloads, a container lifecycle management platform that manages multi-container workloads and services deployed across the nodes, etc.); (ii) execute batch workloads (e.g., user initiated workloads, containerized workloads, etc.) in a containerized environment; (iii) provide service discovery and load balancing (e.g., the cluster may handle demand spikes and achieve higher utilization of the worker nodes by managing wasted/idle (hardware or logical) resource capacity across the worker nodes); (iv) perform storage orchestration; (v) perform automatic resource bin packing; (vi) provide secret and configuration management; (vii) execute one or more services at a global scale on, for example, hundreds of nodes (e.g., IHSs); (viii) in order to provide redundancy and failover capabilities (so that a user may execute an application in a more reliable and resilient way), spin up a newer version of the cluster in parallel and switch traffic to the newer cluster once the newer cluster is ready; (ix) operate as a provider agnostic cluster (e.g., the cluster (and its components) may operate seamlessly regardless of the underlying cloud provider); (x) let a user to manage applications that are made up of, for example, hundreds of containers and to manage those applications in different deployment environments (e.g., in physical or virtual machines, in cloud environments, in hybrid deployment environments, etc.); (xi) provide software-defined data protection; (xii) provide automated data discovery, protection, management, and recovery operations in on-premises; (xiii) provide data deduplication; (xiv) orchestrate data protection (e.g., centralized data protection, self-service data protection, etc.) through one or more graphical user interfaces (GUIs); (xv) empower data owners (e.g., users of the clients) to perform self-service data backup and restore operations from their native applications; (xvi) ensure compliance and satisfy different types of service level objectives (SLOs); (xvii) enable virtualized and cloud deployments, including automated data discovery, protection, management, and recovery operations for in-cloud workloads; (xviii) simplify VM image backups of a VM with near-zero impact on the VM; (xix) streamline data protection for applications and/or containers; (xx) increase resiliency of an organization by enabling rapid recovery or cloud disaster recovery from cyber incidents; (xxi) provide operational simplicity, agility, and flexibility for physical, virtual, and cloud-native IT environments, (xxii) support an infrastructure that is based on a network of computing and storage resources that enable the delivery of shared applications and data (e.g., a cluster may exchange data with other clusters of the same organization registered in/to the network (130) in order to, for example, participate in a collaborative workload placement); and/or (xxiii) initiate multiple data processing or protection operations in parallel (e.g., a master node (104A) may manage multiple operations (via the worker nodes (e.g., 106A, 106B, etc.)), in which each of the multiple operations may (a) manage the initiation of a respective operation and (b) operate concurrently to initiate multiple operations).

In one or more embodiments, the cluster (102) may be capable of providing a range of functionalities/services to the users of the clients (e.g., 120A, 120B, etc.). However, not all of the users may be allowed to receive all of the services. To manage the services provided to the users, a system (e.g., a service manager) in accordance with embodiments of the invention may manage the operation of a network (e.g., 130), in which the clients (e.g., 120A, 120B, etc.) are operably connected to the cluster (102). Specifically, the service manager (i) may identify services to be provided by the cluster (for example, based on the number of users using the clients (e.g., 120A, 120B, etc.)) and (ii) may limit communications of the clients (e.g., 120A, 120B, etc.) to receive provided services.

For example, the priority (e.g., the user access level) of a user may be used to determine how to manage computing resources (e.g., of the worker nodes (e.g., 106A, 106B, etc.)) within the cluster to provide services to that user. As yet another example, the priority of a user may be used to identify the services that need to be provided to that user. As yet another example, the priority of a user may be used to determine how quickly communications (for the purposes of providing services in cooperation with the network (and its subcomponents)) are to be processed by the network.

Further, consider a scenario where a first user is to be treated as a normal user (e.g., a user with a user access level/tier of 4/10). In such a scenario, the user level of that user may indicate that certain ports (of the subcomponents of the network (130) corresponding to communication protocols such as the transmission control protocol (TCP), the user datagram protocol (UDP), etc.) are to be opened, other ports are to be blocked/disabled so that (i) certain services are to be provided to the user by the cluster (e.g., while the computing resources of the worker nodes (e.g., 106A, 106B, etc.) may be capable of providing/performing any number of remote computer-implemented services, they may be limited in providing some of the services over the network (130)) and (ii) network traffic from that user is to be afforded a normal level of quality (e.g., a normal processing rate with a limited communication bandwidth (BW)). By doing so, (i) computer-implemented services provided to the users of the clients (e.g., 120A, 120B, etc.) may be granularly configured without modifying the operation(s) of the clients and (ii) the overhead for managing the services of the clients may be reduced by not requiring modification of the operation(s) of the clients directly.

In contrast, a second user may be determined to be a high priority user (e.g., a user with a user access level of 9/10). In such a case, the user level of that user may indicate that more ports are to be opened than were for the first user so that (i) the cluster (102) may provide more services to the second user and (ii) network traffic from that user is to be afforded a high-level of quality (e.g., a higher processing rate than the traffic from the normal user).

As used herein, a "workload" is a physical or logical component configured to perform certain work functions. Workloads may be instantiated and operated while consuming computing resources allocated thereto. A user may configure a data protection policy for various workload types. Examples of a workload may include (but not limited to): a data protection workload, a VM, a container, a network-attached storage (NAS), a database, an application, a collection of microservices, a file system (FS), small workloads with lower priority workloads (e.g., FS host data, OS data, etc.), medium workloads with higher priority (e.g., VM with FS data, network data management protocol (NDMP) data, etc.), large workloads with critical priority (e.g., mission critical application data), etc.

As used herein, a "policy" is a collection of information, such as a backup policy or other data protection policy, that includes, for example (but not limited to): identity of source data that is to be protected, backup schedule and retention requirements for backed up source data, identity of a service level agreement (SLA) (or a rule) that applies to source data, identity of a target device where source data is to be stored, etc.

As used herein, a "rule" is a guideline used by an SLA component to select a particular target device (or target devices), based on the ability of the target device to meet requirements imposed by the SLA. For example, a rule may specify that a hard disk drive (HDD) having a particular performance parameter should be used as the target device. A target device selected by the SLA component may be identified as part of a backup policy or other data protection policy.

As used herein, an "SLA" between, for example, a vendor (e.g., a manufacturer, a trusted third-party vendor, etc.) and a user may specify one or more user performance requirements (that define, for example, a target device to be chosen dynamically during, and as part of, a data protection process), for example (but not limited to): how many copies should be made of source data, latency requirements, data availability requirements, recovery point objective (RPO) requirements (e.g., if the RPO is set to 1-hour, the corresponding backup operation should be performed again within 1-hour after the start time of the last backup operation of an object), recovery time objective (RTO) requirements, etc. In most cases, the user may be agnostic as to which particular target devices are used, as long as the user performance requirements are satisfied.

As used herein, a "file system" is a method that an OS (e.g., Microsoft® Windows, Apple® MacOS, etc.) uses to control how data is named, stored, and retrieved. For example, once a user has logged into a computing device (e.g., 500, FIG. 5), the OS of that computing device uses the file system (e.g., new technology file system (NTFS), a resilient file system (ReFS), a third extended file system (ext3), etc.) of that computing device to retrieve one or more applications to start performing one or more operations (e.g., functions, tasks, activities, jobs, etc.). As yet another example, a file system may divide a volume (e.g., a logical drive) into a fixed group of bytes to generate one or more blocks of the volume.

In one or more embodiments, a node (e.g., 104A, 106A, etc.) may include (i) a chassis (e.g., a mechanical structure, a rack mountable enclosure, etc.) configured to house one or more servers (or blades) and their components and (ii) any instrumentality or aggregate of instrumentalities operable to compute, classify, process, transmit, receive, retrieve, originate, switch, store, display, manifest, detect, record, reproduce, handle, and/or utilize any form of data (e.g., information, intelligence, etc.) for business, management, entertainment, or other purposes. For example, a node (e.g., 104A, 106A, etc.) may be a personal computer (e.g., a desktop computer, a laptop computer, a mobile computer, a note-book computer, etc.), a personal digital assistant (PDA), a smart phone, a tablet device (or any other a consumer electronic device), a network storage device, a network server, a switch, a router (or any other network communication device), or any other suitable device, and may vary in size, shape, performance, functionality, and price.

In one or more embodiments, as being a physical computing device or a logical computing device, a node (e.g., 104A, 106A, etc.) may be configured for, e.g.: (i) hosting and maintaining various workloads, (ii) providing a computing environment (e.g., computing power and storage) whereon workloads may be implemented, (iii) providing computer-implemented services (e.g., receiving a request, sending a response to the request, database services, electronic communication services, data protection services, etc.) to one or more entities (e.g., users, components of the system (100), etc.), (iv) exchanging data with other components registered in/to the network (130) in order to, for example, participate in a collaborative workload placement, and/or (v) operating as a standalone device. In one or more embodiments, in order to read, write, or store data, a node (e.g., 104A, 106A, etc.) may communicate with, for example, the persistent volume pool (108), the CSS, and/or the BSS (116).

Further, while a single node is considered above, the term "system" includes any collection of systems or sub-systems that individually or jointly execute a set, or multiple sets, of instructions to provide one or more computer-implemented services. For example, a single node may provide a computer-implemented service on its own (i.e., independently) while multiple other nodes may provide a second computer-implemented service cooperatively (e.g., each of the multiple other nodes may provide similar and/or different services that form the cooperatively provided service).

Figure 3:
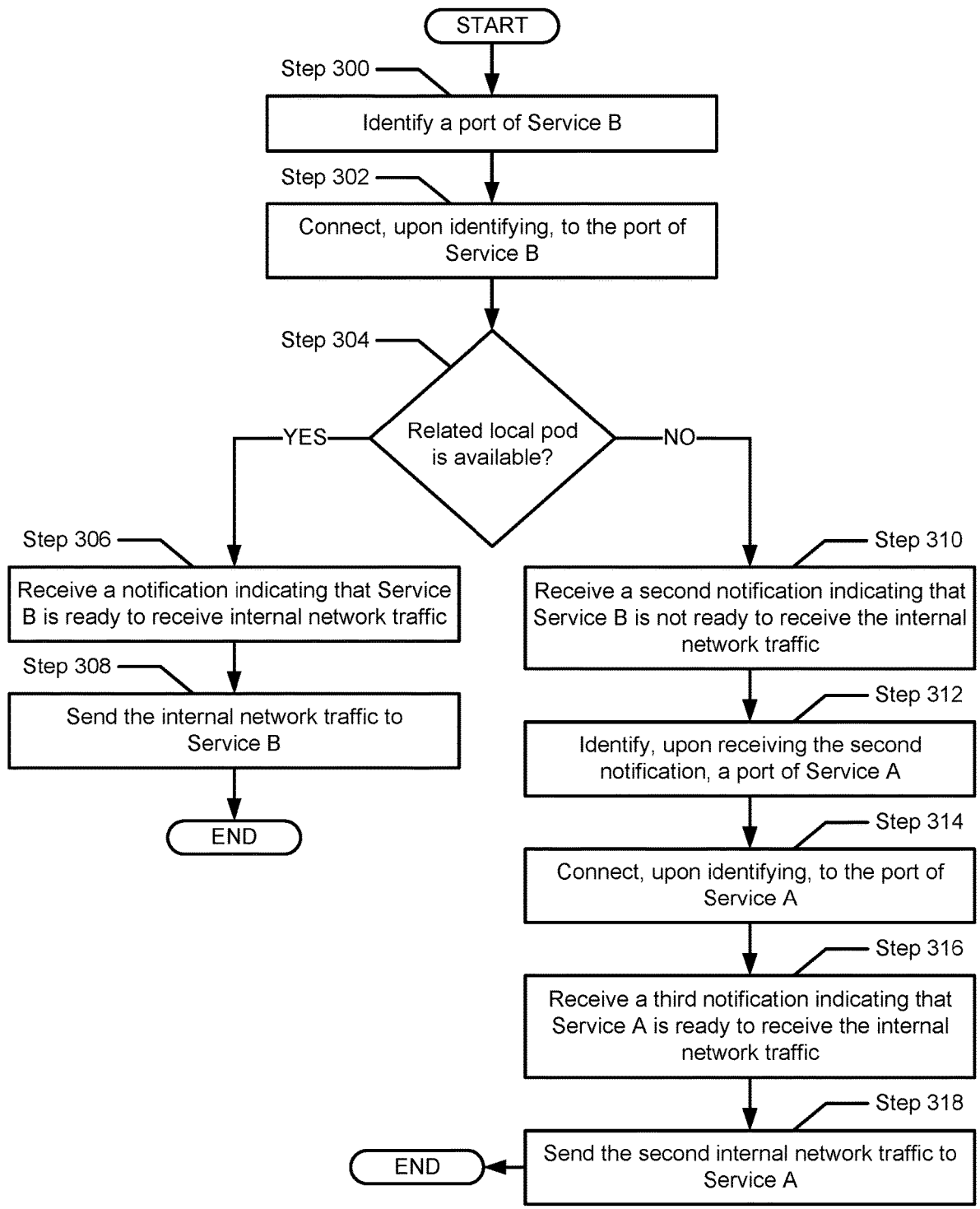
FIG. 3 shows a method for managing internal network traffic in a cluster in accordance with one or more embodiments of the invention.

In one or more embodiments, the instructions may embody one or more of the methods or logic in FIG. 3. In a particular embodiment, the instructions may reside completely, or at least partially, within a storage/memory resource (of, for example, a worker node (or a pod of a worker node)), and/or within a processor (of, for example, a worker node) during execution by the worker node (e.g., 106A, 106B, etc.).

To provide any quantity and any type of computer-implemented services, a node (e.g., 104A, 106A, etc.) may utilize computing resources provided by various hardware components and/or logical components (e.g., virtualization resources). In one or more embodiments, a computing resource (e.g., a measurable quantity of a compute-relevant resource type that may be requested, allocated, and/or consumed) may be (or may include), for example (but not limited to): a central processing unit (CPU), a graphics processing unit (GPU), a data processing unit (DPU), a memory resource, a network resource, storage space/source (e.g., to store any type and quantity of information), storage I/O, a hardware resource set, a compute resource set (e.g., one or more processors, processor dedicated memory, etc.), a control resource set, etc. In one or more embodiments, computing resources of a node (e.g., 104A, 106A, etc.) may be divided into three logical resource sets: a compute resource set, a control resource set, and a hardware resource set. Different resource sets, or portions thereof, from the same or different nodes may be aggregated (e.g., caused to operate as a computing device) to instantiate, for example, a composed node having at least one resource set from each set of the three resource set model.

In one or more embodiments, a CPU may refer to an electronic circuitry that may execute operations and/or instructions (i.e., computer-readable program code and/or machine byte-code) specified by an application. More specifically, a CPU may perform an operation in three steps: (i) fetching instructions related to the operation from memory, (ii) analyzing the fetched instructions, and (iii) performing the operation based on the analysis. In one or more embodiments, the operation may be, for example (but not limited to): a basic arithmetic calculation, comparing numbers, performing a function, displaying a video, etc.

In one or more embodiments, as a central processing virtualization platform, a virtual CPU (vCPU) implementation may be provided to one or more pods (e.g., 154A, FIG. 1.3), in which the vCPU implementation may enable the pods to have direct access to a single physical CPU. More specifically, the vCPU implementation may provide computing capabilities by sharing a single physical CPU among pods.

In one or more embodiments, a GPU may refer to an electronic circuitry that may provide parallel data processing capabilities to generate enhanced, real-time graphics and to perform accelerated computing tasks (which is particularly useful for machine learning (ML) related operations). In one or more embodiments, a GPU may include, for example (but not limited to): a graphics memory controller, a video processing engine (that is configured to or capable of rendering frames at a particular frame rate (and in some cases, configured to or capable of encoding frames at a particular frame rate)), a graphics and computation engine, etc.

In one or more embodiments, as a graphics virtualization platform, a virtual GPU (vGPU) implementation may be provided to one or more pods (e.g., 154A, FIG. 1.3), in which the vGPU implementation may enable the pods to have direct access to a single physical GPU. More specifically, the vGPU implementation may provide parallel data processing and accelerated computing capabilities by sharing a single physical GPU among pods.

In one or more embodiments, a DPU may refer to an electronic circuitry that may perform accelerated data processing and optimized data movement within the cluster (102). In one or more embodiments, a DPU may include, for example (but not limited to): a high-speed networking interface (e.g., 200 gigabits per second (200 Gb/s)), dynamic RAM (DRAM), multi-core (e.g., 8-core) CPU, programmable acceleration engines (particularly for ML, security, and telecommunications purposes), etc.

In one or more embodiments, as a data processing virtualization platform, a virtual DPU (vDPU) implementation may be provided to one or more pods (e.g., 154A, FIG. 1.3), in which the vDPU implementation may enable the pods to have direct access to a single physical DPU. More specifically, the vDPU implementation may provide full data center-on-chip programmability, and high-performance networking and computing capabilities by sharing a single physical DPU among pods.

Figure 5:
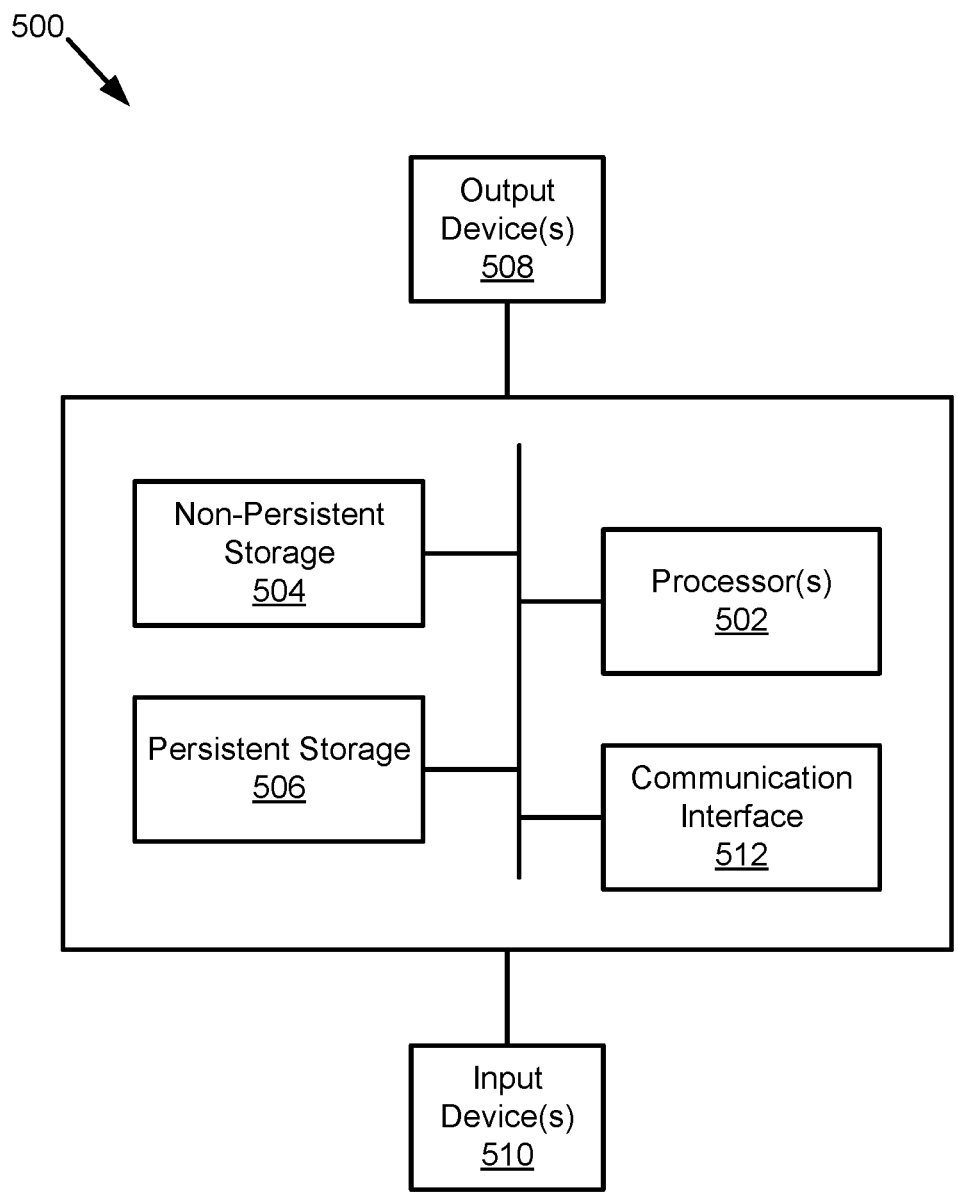
FIG. 5 shows a diagram of a computing device in accordance with one or more embodiments of the invention.

In one or more embodiments, a memory resource may be any hardware component that is used to store data in a computing device (e.g., 500, FIG. 5). The data stored in a memory resource may be accessed almost instantly (e.g., in milliseconds (ms)) regardless of where the data is stored in the memory resource. In most cases, a memory resource may provide the aforementioned instant data access because the memory resource may be directly connected to a CPU on a wide and fast bus connection (e.g., a high-speed internal connection that transfers data between the hardware components of a computing device).

In one or more embodiments, a memory resource may be (or may include), for example (but not limited to): DRAM (e.g., DDR4 DRAM, error correcting code (ECC) DRAM, etc.), persistent memory (PMEM) (e.g., (i) physical computer memory, for data storage, that includes both storage and memory attributes; (ii) byte-addressable like memory that is capable of providing byte-level access of data to applications and/or other logical components; etc.), Flash memory, etc. In one or more embodiments, DRAM may be volatile, which may mean DRAM only stores data as long as it is being supplied with power. Additionally, PMEM and Flash memory may be non-volatile, in which they may store data even after a power supply is removed.

In one or more embodiments, a network resource (or simply "network") may refer to (i) a computer network including two or more computers that are connected any combination of wired and/or wireless connections and/or (ii) for example, a network interface card (NIC) and a network adapter, which may be may be specified in base units of bits per second (bps). The computer network may be generated using hardware components (e.g., routers, access points, cables, switches, etc.) and software components (e.g., OSs, business applications, etc.). In one or more embodiments, geographic location may define a computer network. For example, a local area network (LAN) may connect computing devices in a defined physical space (e.g., in an office building), whereas a wide area network (WAN) (e.g., Internet) may connect computing devices across continents. In one or more embodiments, the computer network may be defined based on network protocols (e.g., TCP, UDP, IPv4, etc.).

In one or more embodiments, storage space (or simply "storage") may refer to a hardware component that is used to store data in a computing device (e.g., 500, FIG. 5). In one or more embodiments, storage may be a physical computer-readable medium. For example, storage may be (or may include) HDDs, Flash-based storage devices (e.g., solid-state drives (SSDs)), tape drives, FC based storage devices, and/or other physical/logical storage media ((i) logical storage (e.g., virtual disk) may be implemented using one or more physical storage devices whose storage resources (all, or a portion) are allocated for use using a software layer, and (ii) logical storage may include both physical storage devices and an entity executing on a processor (or other hardware device) that allocates the storage resources of the physical storage devices). Storage may be other types of storage not listed above without departing from the scope of the invention.

In one or more embodiments, storage may be configured as a storage array (e.g., a NAS), in which the storage array may refer to a collection of one or more physical storage devices that may consolidate various forms of data. Each physical storage device may include non-transitory computer readable storage media, in which data may be stored in whole or in part, and temporarily or permanently.

In one or more embodiments, a hardware resource set (e.g., of a node) may include (or specify), for example (but not limited to): a configurable CPU option (e.g., a valid/legitimate vCPU count per-pod option), a configurable network resource option (e.g., enabling/disabling single-root input/output virtualization (SR-IOV) for specific pods), a configurable memory option (e.g., maximum and minimum memory per-pod), a configurable GPU option (e.g., allowable scheduling policy and/or vGPU count combinations per-pod), a configurable DPU option (e.g., legitimacy of disabling inter-integrated circuit (I2C) for various pods), a configurable storage space option (e.g., a list of disk cloning technologies across all pods), a configurable storage I/O option (e.g., a list of possible file system block sizes across all target file systems), a user type (e.g., a knowledge worker, a task worker with relatively low-end compute requirements, a high-end user that requires a rich multimedia experience, etc.), a network resource related template (e.g., a 10 GB/s BW with 20 ms latency quality of service (QOS) template, a 10 GB/s BW with 10 ms latency QoS template, etc.), a DPU related template (e.g., a 1 GB/s BW vDPU with 1 GB vDPU frame buffer template, a 2 GB/s BW vDPU with 1 GB vDPU frame buffer template, etc.), a GPU related template (e.g., a depth-first vGPU with 1 GB vGPU frame buffer template, a depth-first vGPU with 2 GB vGPU frame buffer template, etc.), a storage space related template (e.g., a 40 GB SSD storage template, an 80 GB SSD storage template, etc.), a CPU related template (e.g., a 1 vCPU with 4 cores template, a 2 vCPUs with 4 cores template, etc.), a memory resource related template (e.g., a 4 GB DRAM template, an 8 GB DRAM template, etc.), a vCPU count per-pod, a virtual NIC (vNIC) count per-pod, a wake on LAN support configuration (e.g., supported/enabled, not supported/disabled, etc.), a swap space configuration per-pod, a vGPU count per-pod, a type of a vGPU scheduling policy (e.g., a "fixed share" vGPU scheduling policy, an "equal share" vGPU scheduling policy, etc.), a type of a GPU virtualization approach, a storage mode configuration (e.g., an enabled high-performance storage array mode, a disabled high-performance storage array mode, etc.), a file system block size, a backup frequency (e.g., hourly, daily, monthly, etc.), etc.

In one or more embodiments, a control resource set (e.g., of a node) may facilitate formation of, for example, a composed node within the cluster (102). To do so, a control resource set may prepare any quantity of computing resources from any number of hardware resource sets (e.g., of the corresponding node and/or other nodes) for presentation. Once prepared, the control resource set may present the prepared computing resources as bare metal resources to a composer (not shown) of a master node (e.g., 104A). By doing so, a composed node may be instantiated.

To prepare the computing resources of the hardware resource sets for presentation, the control resource set may employ, for example, virtualization, indirection, abstraction, and/or emulation. These management functionalities may be transparent to applications hosted by the instantiated/composed node. Consequently, while unknown to components of a composed node, the composed node may operate in accordance with any number of management models thereby providing for unified control and management of the composed node.

In one or more embodiments, the composer may implement a management model to manage computing resources (e.g., computing resources provided by one or more hardware/software devices of worker nodes (e.g., 106A, 106B, etc.)) in a particular manner. The management model may give rise to additional functionalities for the computing resources. For example, the management model may be automatically store multiple copies of data in multiple locations when a single write of the data is received. By doing so, a loss of a single copy of the data may not result in a complete loss of the data. Other management models may include, for example, adding additional information to stored data to improve its ability to be recovered, methods of communicating with other devices to improve the likelihood of receiving the communications, etc. Any type and numbers of management models may be implemented to provide additional functionalities using the computing resources without departing from the scope of the invention.

In one or more embodiments, in conjunction with the composer, a system control processor (not shown) of a corresponding worker node may cooperatively enable hardware resource sets of other worker nodes to be prepared and presented as bare metal resources to a composed "worker" node. In one or more embodiments, a compute resource set, a control resource set, and/or a hardware resource set may be implemented as separate physical devices. In such a scenario, any of these resource sets may include NICs or other devices to enable the hardware devices of the respective resource sets to communicate with each other.

One of ordinary skill will appreciate that the composer may perform other functionalities without departing from the scope of the invention. The composer may be implemented using hardware (i.e., circuitry), software, or any combination thereof.

In one or more embodiments, a node (e.g., 104A, 106A, etc.) may split up a request (e.g., an operation, a task, an activity, etc.) with another component of the system (100), coordinating its efforts to complete the request more efficiently than if the node had been responsible for completing the request. A request may be, for example (but not limited to): a web browser search request, a representational state transfer (REST) request, a computing request, a database management request, a registration request, a file upload/download request, etc. To provide computer-implemented services to one or more entities, a node may perform computations locally and/or remotely. By doing so, the node may utilize different computing devices (e.g., 500, FIG. 5) that have different quantities of computing resources to provide a consistent experience to the entities. In one or more embodiments, a node may be a heterogeneous set, including different types of hardware components and/or different types of OSs.

In one or more embodiments, a node (e.g., 104A, 106A, etc.) may host any number of applications (and/or content accessible through the applications) that provide application services to the clients (e.g., 120A, 120B, etc.). Application services may include, for example (but not limited to): instant messaging services, file storage services, web-based services, desktop-based services, workload placement collaboration services, serving (e.g., processing) a request, sharing an application log, receiving computing resource details of a node, transmitting a request, analyzing data, streaming video, etc. In order to provide application services, each application may host similar or different components. The components may be, for example (but not limited to): instances of databases, instances of email servers, etc.

Further, applications may vary in different embodiments, but in certain embodiments, applications may be custom developed or commercial (e.g., off-the-shelf) applications that a user desires to execute in a node (e.g., 104A, 106A, etc.). In one or more embodiments, applications may be logical entities executed using computing resources of a node. For example, applications may be implemented as computer instructions, e.g., computer code, stored on persistent storage of a node that when executed by the processor(s) of the node, cause the node to provide the functionality of the applications described throughout the application.

In one or more embodiments, while performing, for example, one or more operations requested by a user of a client (e.g., 120A, 120B, etc.), applications installed on a node (e.g., 104A, 106A, etc.) may include functionality to request and use resources (e.g., data, metadata, computing resources, etc.) of the node. Applications may also perform other types of functionalities not listed above without departing from the scope of the invention. In one or more embodiments, while providing application services to a user, applications may store (temporarily or permanently) data that may be relevant to the user in persistent storage of the node.

In one or more embodiments, in order to provide the above-mentioned functionalities, a node (e.g., 104A, 106A, etc.) may need to communicate with other components of the system (100) with minimum amount of latency (e.g., with high-throughput (e.g., a high data transfer rate) and sub-ms latency). For this reason, REST application programming interfaces (REST APIs) may be used to enable communication(s) between the node and other components.

As discussed above, a node (e.g., 104A, 106A, etc.) may provide any quantity and type of computer-implemented services (e.g., to a user upon request). To provide the computer-implemented services, resources of the node (discussed above) may be used to instantiate a composed node (within the cluster (102)). The composed node may also provide any quantity and type of computer-implemented services (e.g., to a user upon request).

While a node (e.g., 104A, 106A, etc.) has been illustrated and described as including a limited number of specific components and/or hardware resources, the node may include additional, fewer, and/or different components without departing from the scope of the invention. One of ordinary skill will appreciate that a node (e.g., 104A, 106A, etc.) may perform other functionalities without departing from the scope of the invention.

In one or more embodiments, a node (e.g., 104A, 106A, etc.) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the node described throughout this application.

Alternatively, in one or more embodiments, the node (e.g., 104A, 106A, etc.) may be implemented as a logical device. The logical device may utilize the computing resources of any number of computing devices to provide the functionality of the node described throughout this application.

In one or more embodiments, the persistent volume pool (108) may represent a logical or virtual aggregation of storage capacity from which one or more persistent volumes (e.g., PV A (109A), PV B (109B), etc.) may be provisioned. A persistent volume may refer to a cluster (102) resource through which persistent (i.e., non-volatile) storage may be provided to one or more containers (e.g., 156A, 158A, etc., FIG. 1.3) implementing stateful workloads. A stateful workload may refer to an application that may include functionality to read (i.e., retrieve) and write (i.e., store) data and state from/to persistent disk storage. Database applications, which execute in a containerized environment, may be examples of stateful workloads. Further, the persistent volume pool (108) may be formed from one or more physical storage devices (not shown). These physical storage device(s) may, for example, reside in networked storage systems (e.g., the CSS, the BSS (116), etc.) operatively connected to and independent of the cluster (102).

One of ordinary skill will appreciate that the persistent volume pool (108) may perform other functionalities without departing from the scope of the invention. The persistent volume pool (108) may be implemented using hardware, software, or any combination thereof.

In one or more embodiments, the BSS plug-in may represent a computer program that facilitates interchange between, for example, a worker node (e.g., 106A) and the BSS (116). Specifically, the BSS plug-in may represent a device driver or a device interface through which BSS (116) functions and resources may be invoked and accessed, respectively. To that extent, the BSS plug-in may include the following functionalities, for example (but not limited to): interfacing one or more persistent volumes (described above), provisioned from the persistent volume pool (108), with the BSS (116); translating I/O (i.e., read and/or write) requests from a master node (e.g., 104A) to the BSS (116); translating I/O (i.e., read and/or write) requests from a worker node (e.g., 106A) to the BSS (116), etc.

One of ordinary skill will appreciate that the BSS plug-in may perform other functionalities without departing from the scope of the invention. Further, for the BSS plug-in to execute across the cluster (102), at least each of the one or more worker nodes (e.g., 106A, 106B, etc.) may be required to have the BSS plug-in installed and executing thereon.

In one or more embodiments, the CSS plug-in may represent a computer program that facilitates interchange between, for example, a worker node (e.g., 106A) and the CSS. Specifically, the CSS plug-in may represent a device driver or a device interface through which CSS functions and resources may be invoked and accessed, respectively. To that extent, the CSS plug-in may include the following functionalities, for example (but not limited to): interfacing one or more persistent volumes (described above), provisioned from the persistent volume pool (108), with the CSS (114); translating I/O (i.e., read and/or write) requests from a master node (e.g., 104A) to the CSS; translating I/O (i.e., read and/or write) requests from a worker node (e.g., 106A) to the CSS; etc.

One of ordinary skill will appreciate that the CSS plug-in may perform other functionalities without departing from the scope of the invention. Further, for the CSS plug-in to execute across the cluster (102), at least each of the one or more worker nodes (e.g., 106A, 106B, etc.) may be required to have the CSS plug-in installed and executing thereon.

In one or more embodiments, one or more worker nodes (e.g., 106A, 106B, etc.) may be connected to a container registry (not shown). A container registry may represent a storage service dedicated to consolidating container images (of a container (e.g., 156A, 158A, etc., FIG. 1.3)). A container image may represent a foundation snapshot (e.g., a template), for a given workload or application type, from which deployed workloads, sought to be implemented, may be based. For example, should a data backup workload be deployed onto the cluster (102), an existing data backup container image may be retrieved from the container registry and used as a template for implementing a containerized environment (i.e., a container) where a data backup application may execute.

Accordingly, a container image may include all that which may be necessary to implement any given workload, such as relevant code and dependencies (e.g., system tools, system libraries, settings, etc.). Further, the container registry may be implemented on one or more servers (not shown). Each server may be a physical server (i.e., residing within a data center) or a virtual server (i.e., residing in a cloud-computing environment). Additionally or alternatively, the container registry may be implemented on one or more other computing devices/systems similar to the exemplary computing device shown in FIG. 5.

In one or more embodiments, the CSS may represent a networked storage system dedicated to the consolidation of cluster (102) pertinent data (e.g., user and/or application data accessed by one or more containers (e.g., 156A, 158A, etc., FIG. 1.3)). The CSS may be implemented on one or more servers (not shown). Each server may be a physical server (i.e., residing within a data center) or a virtual server (i.e., residing in a cloud-computing environment). Additionally or alternatively, the CSS may be implemented on one or more other computing devices/systems similar to the exemplary computing device shown in FIG. 5.

Further, the CSS may include one or more physical storage devices and/or media. The one or more physical storage devices and/or media may or may not be of the same type and/or may or may not be co-located at a same site. In one or more embodiments, the CSS may include and provide persistent (i.e., non-volatile) data storage. Examples of persistent data storage include (but not limited to): optical storage, magnetic storage, NAND Flash memory, NOR Flash memory, Magnetic RAM (MRAM), spin torque magnetic RAM (ST-MRAM), phase-change memory (PCM), etc.

In one or more embodiments, the CSS may include alert event data/entries, in which the alert event data is a type of event data associated with certain events that indicate unstable, problematic, or otherwise malfunctioning operations of a container (e.g., 156A, 158A, etc., FIG. 1.3). Alert event data may be added by a user of a client (e.g., 120A, 120B, etc.) and/or automatically generated by a corresponding worker node manager (e.g., 150, FIG. 1.3). In one or more embodiments, the CSS may be associated with (and store) alert event data of a particular type (e.g., critical errors, warnings, minor exceptions, etc.). Thus, in such embodiments, the CSS may be searched by the master node manager (e.g., 142, FIG. 1.2) depending on the type of alert data of interest.

One of ordinary skill will appreciate that the CSS may perform other functionalities without departing from the scope of the invention. The CSS may be implemented using hardware, software, or any combination thereof.

In one or more embodiments, the BSS (116) may represent a networked data backup, archiving, and/or disaster recovery storage system. The BSS (116) may be dedicated to the consolidation of backup copies (or snapshots) of cluster (102) pertinent data (e.g., backup copies of user and/or application data accessed by one or more containers (e.g., 156A, 158A, etc., FIG. 1.3)). The BSS (116) may be implemented on one or more servers (not shown). Each server may be a physical server (i.e., residing within a data center) or a virtual server (i.e., residing in a cloud-computing environment). Additionally or alternatively, the BSS (116) may be implemented on one or more other computing devices/systems similar to the exemplary computing device shown in FIG. 5.

Further, the BSS (116) may include one or more physical storage devices and/or media. The one or more physical storage devices and/or media may or may not be of the same type and/or may or may not be co-located at a same site. In one or more embodiments, the BSS (116) may include and provide persistent data storage. Examples of persistent data storage include (but not limited to): optical storage, magnetic storage, NAND Flash memory, NOR Flash memory, MRAM, ST-MRAM, PCM, etc.

In one or more embodiments, the BSS (116) may include a production agent, which is configured to, at least, (i) locally orchestrate the performance of data protection operations, (ii) provide long-term data retention (in particular, data that is generated by one or more pods (e.g., 154A, 154B, etc., FIG. 1.3) so that once a pod is restarted, all the related data may be restored), and/or (iii) provide dynamic NAS backup and recovery. For example, the production agent may perform a data protection operation under the direction of a client (e.g., 120A, 120B, etc.), in which the client sends instructions to the production agent regarding: (i) when one or more operations should be performed, (ii) where the resulting data backup(s) should be stored (temporarily or permanently), and/or (iii) when a VM (or a container) should be restored to a previous state. Other instructions not listed above may also be sent without departing from the scope of the invention.

One of ordinary skill will appreciate that the BSS (116) may perform other functionalities without departing from the scope of the invention. The BSS (116) may be implemented using hardware, software, or any combination thereof.

In one or more embodiments, a client (e.g., 120A, 120B, etc.) may include functionality to, e.g.: (i) capture sensory input (e.g., sensor data) in the form of text, audio, video, touch or motion, (ii) collect massive amounts of data at the edge of an Internet of things (IoT) network (where, the collected data may be grouped as: (a) data that needs no further action and does not need to be stored, (b) data that should be retained for later analysis and/or record keeping, and (c) data that requires an immediate action/response), (iii) provide to other entities (e.g., the cluster (102)), store, or otherwise utilize captured sensor data (and/or any other type and/or quantity of data), and/or (iv) provide surveillance services (e.g., determining object-level information, performing face recognition, etc.) for scenes (e.g., a physical region of space).

In one or more embodiments, a client (e.g., 120A, 120B, etc.) may be a physical or logical computing device configured for hosting one or more workloads, or for providing a computing environment whereon workloads may be implemented. The client may provide computing environments that are configured for, at least: (i) workload placement collaboration, (ii) computing resource (e.g., processing, storage/memory, virtualization, networking, etc.) exchange, and/or (iii) protecting workloads (including their applications and application data) of any size and scale (based on, for example, one or more SLAs configured by users of the client).

In one or more embodiments, a client (e.g., 120A, 120B, etc.) may include any number of applications (and/or content accessible through the applications) that provide computer-implemented application services to a user. Applications may be designed and configured to perform one or more functions instantiated by a user of the client. In order to provide application services, each application may host similar or different components. The components may be, for example (but not limited to): instances of databases, instances of email servers, etc. Applications may be executed on one or more clients as instances of the application.

In one or more embodiments, while performing, for example, one or more operations requested by a user, applications installed on a client (e.g., 120A, 120B, etc.) may include functionality to request and use physical and logical resources of the client. Applications may also include functionality to use data stored in storage/memory resources of the client. The applications may perform other types of functionalities not listed above without departing from the scope of the invention. While providing application services to a user, applications may store data that may be relevant to the user in storage/memory resources of the client.

As being a physical or logical computing device, a client (e.g., 120A, 120B, etc.) may oversee cluster (102) operations and issue workload requests (which are actually initiated by users). To this end, to provide services to the users, a client may utilize, rely on, or otherwise cooperate with the cluster (102) (e.g., by interfacing with a master node (e.g., 104A) via the master node interface (e.g., 146, FIG. 1.2)). For example, a client may issue a request (e.g., a request to configure the cluster (102) via a master node (e.g., 104A), a workload request to implement user-defined workloads on the cluster (102) via the master node, etc.) to the cluster (102) to receive responses and interact with various components of the cluster. A client (e.g., 120A, 120B, etc.) may also request data from and/or send data to the cluster (102) (for example, a client may transmit information to a master node (e.g., 104A) that allows the master node to perform computations, the results of which are used by the clients to provide services to the users).

As yet another example, a client (e.g., 120A, 120B, etc.) may utilize application services provided by a master node (e.g., 104A). When the client interacts with the master node, data that is relevant to the clients may be stored (temporarily or permanently) in a database (e.g., etcd) of the master node. When a new user is identified, the database may add information of the new user to the database. By doing so, data that is relevant to clients may be stored in the database. This may be done because clients may desire access to the information of the new user at a later point-in-time.

As yet another example, a client (e.g., 120A, 120B, etc.) may send instructions to the production agent of the BSS (116) to configure the BSS. In one or more embodiments, instructions may be, for example (but not limited to): instructions to configure a backup policy, instructions to take a snapshot of container data, etc. As yet another example, a client (e.g., 120A, 120B, etc.) may initiate an application to execute on a master node (e.g., 104A) such that the application may (itself) gather, transmit, and/or otherwise manipulate data located in the master node, remote to the client. In one or more embodiments, a client may share access to more than one node (of the cluster (102)) and may similarly share any data located in those nodes.

In one or more embodiments, a client (e.g., 120A, 120B, etc.) may be capable of, e.g.: (i) collecting users' inputs, (ii) correlating collected users' inputs to the computer-implemented services to be provided to the users, (iii) communicating with the cluster (102) that performs computations necessary to provide the computer-implemented services, (iv) using the computations performed by the cluster to provide the computer-implemented services in a manner that appears (to the users) to be performed locally to the users, and/or (v) communicating with any virtual desktop (VD) in a virtual desktop infrastructure (VDI) environment (or a virtualized architecture) provided by the cluster (using any known protocol in the art), for example, to exchange remote desktop traffic or any other regular protocol traffic (so that, once authenticated, users may remotely access independent VDs). One of ordinary skill will appreciate that a client may perform other functionalities without departing from the scope of the invention.

In one or more embodiment, a VDI environment (or a virtualized architecture) may be employed for numerous reasons, for example (but not limited to): to manage resource (or computing resource) utilization, to provide cost-effective scalability across multiple servers, to provide a workload portability across multiple servers, to streamline an application development by certifying to a common virtual interface rather than multiple implementations of physical hardware, to encapsulate complex configurations into a file that is easily replicated and provisioned, etc.

As described above, a client (e.g., 120A, 120B, etc.) may provide computer-implemented services to users (and/or other computing devices). A client may provide any number and any type of computer-implemented services. To provide computer-implemented services, a client may include a collection of physical components (e.g., processing resources, storage/memory resources, networking resources, etc.) configured to perform operations of the client and/or otherwise execute a collection of logical components (e.g., virtualization resources) of the client.

In one or more embodiments, a processing resource (not shown) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a CPU, a GPU, a DPU, a computation acceleration resource, an application-specific integrated circuit (ASIC), a digital signal processor for facilitating high speed communication, etc.

In one or more embodiments, a storage or memory resource (not shown) may refer to a measurable quantity of a storage/memory-relevant resource type, which can be requested, allocated, and consumed (for example, to store sensor data and provide previously stored data). A storage/memory-relevant resource type may encompass a physical device, a logical intelligence, or a combination thereof, which may provide temporary or permanent data storage functionality and/or services. Examples of a storage/memory-relevant resource type may be (but not limited to): an HDD, an SSD, RAM, Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), PMEM, virtualized storage, virtualized memory, etc.

In one or more embodiments, while a client (e.g., 120A, 120B, etc.) provide computer-implemented services to users, the client may store data that may be relevant to the users to the storage/memory resources. When the user-relevant data is stored (temporarily or permanently), the user-relevant data may be subjected to loss, inaccessibility, or other undesirable characteristics based on the operation of the storage/memory resources.

To mitigate, limit, and/or prevent such undesirable characteristics, users of the client may enter into agreements (e.g., SLAs) with providers (e.g., vendors) of the storage/memory resources. These agreements may limit the potential exposure of user-relevant data to undesirable characteristics. These agreements may, for example, require duplication of the user-relevant data to other locations so that if the storage/memory resources fail, another copy (or other data structure usable to recover the data on the storage/memory resources) of the user-relevant data may be obtained. These agreements may specify other types of activities to be performed with respect to the storage/memory resources without departing from the scope of the invention.

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a NIC, a network adapter, a network processor, etc.

In one or more embodiments, a networking resource may provide capabilities to interface a client with external entities (e.g., the cluster (102)) and to allow for the transmission and receipt of data with those entities. A networking resource may communicate via any suitable form of wired interface (e.g., Ethernet, fiber optic, serial communication etc.) and/or wireless interface, and may utilize one or more protocols (e.g., the TCP, the UDP, Remote Direct Memory Access (RDMA), IEEE 801.11, etc.) for the transmission and receipt of data.

In one or more embodiments, a networking resource may implement and/or support the above-mentioned protocols to enable the communication between the client and the external entities. For example, a networking resource may enable the client to be operatively connected, via Ethernet, using a TCP protocol to form a "network fabric", and may enable the communication of data between the client and the external entities. In one or more embodiments, each client may be given a unique identifier (e.g., an Internet Protocol (IP) address) to be used when utilizing the above-mentioned protocols.

Further, a networking resource, when using a certain protocol or a variant thereof, may support streamlined access to storage/memory media of other clients (e.g., 120A, 120B, etc.). For example, when utilizing RDMA to access data on another client, it may not be necessary to interact with the logical components of that client. Rather, when using RDMA, it may be possible for the networking resource to interact with the physical components of that client to retrieve and/or transmit data, thereby avoiding any higher-level processing by the logical components executing on that client.

In one or more embodiments, a virtualization resource (not shown) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a vCPU, a virtual storage pool, etc.

In one or more embodiments, a virtualization resource may include a hypervisor (e.g., a VM monitor), in which the hypervisor may be configured to orchestrate an operation of, for example, a VM by allocating computing resources of a client (e.g., 120A, 120B, etc.) to the VM. In one or more embodiments, the hypervisor may be a physical device including circuitry. The physical device may be, for example (but not limited to): a field-programmable gate array (FPGA), an application-specific integrated circuit, a programmable processor, a microcontroller, a digital signal processor, etc. The physical device may be adapted to provide the functionality of the hypervisor. Alternatively, in one or more of embodiments, the hypervisor may be implemented as computer instructions stored on storage/memory resources of the client that when executed by processing resources of the client, cause the client to provide the functionality of the hypervisor.

In one or more embodiments, a client (e.g., 120A, 120B, etc.) may be implemented as a computing device (e.g., 500, FIG. 5). A computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the client described throughout the application.

Alternatively, in one or more embodiments, similar to a node (e.g., 104A, 106A, etc.), a client (e.g., 120A, 120B, etc.) may also be implemented as a logical device.

In one or more embodiments, users may interact with (or operate) clients (e.g., 120A, 120B, etc.) in order to perform work-related tasks (e.g., production workloads). In one or more embodiments, accessibility of users to the clients may depend on a regulation set by an administrator of the clients. To this end, each user may have a personalized user account that may, for example, grant access to certain data, applications, and computing resources of the clients. This may be realized by implementing the virtualization technology. In one or more embodiments, an administrator may be a user with permission (e.g., a user that has root-level access) to make changes on the clients that will affect other users of the clients.

In one or more embodiments, for example, a user may be automatically directed to a login screen of a client when the user connected to that client. Once the login screen of the client is displayed, the user may enter credentials (e.g., username, password, etc.) of the user on the login screen. The login screen may be a GUI generated by a visualization module (not shown) of the client. In one or more embodiments, the visualization module may be implemented in hardware (e.g., circuitry), software, or any combination thereof.

In one or more embodiments, a GUI may be displayed on a display of a computing device (e.g., 500, FIG. 5) using functionalities of a display engine (not shown), in which the display engine is operatively connected to the computing device. The display engine may be implemented using hardware, software, or any combination thereof. The login screen may be displayed in any visual format that would allow the user to easily comprehend (e.g., read, view, parse, interact with, etc.) the listed information.

In one or more embodiments, all, or a portion, of the components of the system (100) may be operably connected each other and/or other entities via any combination of wired and/or wireless connections. For example, the aforementioned components may be operably connected, at least in part, via the network (130). Further, all, or a portion, of the components of the system (100) may interact with one another using any combination of wired and/or wireless communication protocols.

In one or more embodiments, the network (130) may represent a (decentralized or distributed) computing network and/or fabric configured for computing resource and/or messages exchange among registered computing devices (e.g., the clients, the cluster, etc.). As discussed above, components of the system (100) may operatively connect to one another through the network (e.g., a storage area network (SAN), a personal area network (PAN), a LAN, a metropolitan area network (MAN), a WAN, a mobile network, a wireless LAN (WLAN), a virtual private network (VPN), an intranet, the Internet, etc.), which facilitates the communication of signals, data, and/or messages. In one or more embodiments, the network may be implemented using any combination of wired and/or wireless network topologies, and the network may be operably connected to the Internet or other networks. Further, the network (130) may enable interactions between, for example, the clients and the cluster through any number and type of wired and/or wireless network protocols (e.g., TCP, UDP, IPv4, etc.).

The network (130) may encompass various interconnected, network-enabled subcomponents (not shown) (e.g., switches, routers, gateways, cables etc.) that may facilitate communications between the components of the system (100). In one or more embodiments, the network-enabled subcomponents may be capable of: (i) performing one or more communication schemes (e.g., IP communications, Ethernet communications, etc.), (ii) being configured by one or more components in the network, and (iii) limiting communication(s) on a granular level (e.g., on a per-port level, on a per-sending device level, etc.). The network (130) and its subcomponents may be implemented using hardware, software, or any combination thereof.

In one or more embodiments, before communicating data over the network (130), the data may first be broken into smaller batches (e.g., data packets) so that larger size data can be communicated efficiently. For this reason, the network-enabled subcomponents may break data into data packets. The network-enabled subcomponents may then route each data packet in the network (130) to distribute network traffic uniformly.

In one or more embodiments, the network-enabled subcomponents may decide how real-time (e.g., on the order of ms or less) network traffic and non-real-time network traffic should be managed in the network (130). In one or more embodiments, the real-time network traffic may be high-priority (e.g., urgent, immediate, etc.) network traffic. For this reason, data packets of the real-time network traffic may need to be prioritized in the network (130). The real-time network traffic may include data packets related to, for example (but not limited to): videoconferencing, web browsing, voice over Internet Protocol (VOIP), etc.

While FIG. 1.1 shows a configuration of components, other system configurations may be used without departing from the scope of the invention.

Turning now to FIG. 1.2, FIG. 1.2 shows a diagram of a master node (e.g., 104A) and a portion of the system (e.g., 100, FIG. 1.1) (from a different perspective) in accordance with one or more embodiments of the invention. The master node (104A) includes the composer (not shown), a master node interface (146), a master node manager (142), a cluster configuration repository (140), and a backup/restore manager (144). The master node (104A) may include additional, fewer, and/or different components without departing from the scope of the invention. Each component may be operably connected to any of the other component via any combination of wired and/or wireless connections. Each component illustrated in FIG. 1.2 is discussed below.

In one or more embodiments, the master node manager (142) (or the control plane) may include functionality to, e.g.: (i) be dedicated to the management of the cluster (e.g., 102, FIG. 1.1); (ii) receive a request (e.g., an intention request, a workload/job request, a volume generation request, etc.) from a user via a client (e.g., receiving a request to execute a certain application or functionality on a bare metal system or on a composed worker node (e.g., 106A)) via the master node interface (146); (iii) analyze an intention specified in a request received from a user, for example, (a) to decide where (e.g., which worker node) to deploy one or more workloads and/or (b) to generate one or more persistent volumes; (iv) perform analytics pertinent to the cluster (e.g., 102, FIG. 1.1); (v) be responsible for the management of one or more pods (e.g., 154A, 154B, etc., FIG. 1.3) deployed to one or more worker nodes (e.g., 106A, 106B, etc.) (including management of policy actions on a worker node); (vi) be dedicated to binding (or assigning) workloads, sought to be implemented, to one or more worker nodes; (vii) deploy one or more workloads to an appropriate worker node based on (a) available computing resources (e.g., computing, memory, storage, virtualization, etc.) of the worker node and/or (b) one or more workload requirements (obtained from the cluster configuration repository (140)); (viii) monitor the availability of computing resources on each of the worker nodes; (ix) notify a user (via the master node interface (146) and a GUI of the corresponding client) with respect to a determined workload-to-worker node assignment; (x) generate/manage/monitor one or more services (Kubernetes services) (e.g., 210, 212, etc., FIG. 2) and/or pods (including lifecycle of applications being executed on the pods); (xi) perform scheduling and/or orchestration of one or more pods/containers; (xii) perform load balancing and autoscaling when, for example, CPU utilization of a container reaches a certain level, the master node manager may keep adding new replicas of the container until the utilization falls behind a predetermined threshold (e.g., to accommodate the demand); (xiii) communicate with each worker node manager (e.g., 150, FIG. 1.3) across the cluster (e.g., 102, FIG. 1.1) to infer which container is healthy (or unhealthy); (xiv) allocate IP (e.g., IPv4, IPv6, etc.) addresses to pods and services; (xv) ensure that workloads are distributed evenly (across as many worker nodes as possible) and try to place replica pods on different worker nodes to maintain high availability for services; (xvi) at the deployment level, monitor pod deployments and replicas across the cluster (in particular, unavailable replicas, which may indicate a capacity problem); (xvii) at the container level, monitor computing resource usage per container (and readiness of each container); (xviii) schedule containers on different worker nodes based on workload and the available computing resources on each worker node; and/or (xix) store (temporarily or permanently) the aforementioned data and/or the output(s) of the above-discussed processes in the CSS or etcd (of the master node (104A)).

In one or more embodiments, the master node manager (142) may further include functionality to, e.g.: (i) manage distribution or allocation of available computing resources (e.g., user subscriptions to available resources) against a particular pod on a worker node (e.g., 106A, 106B, etc.); (ii) obtain and track (periodically or on demand) resource utilization levels (or key performance metrics with respect to, for example, network latency, the number of open ports, OS vulnerability, network port open/close integrity, password policy, data protection/encryption, data privacy/confidentiality, data integrity, data availability, be able to identify and protect against anticipated and/or non-anticipated security threats/breaches, etc.) of pods across all worker nodes (by obtaining telemetry data and/or logs) to identify (a) which pod is a healthy pod (e.g., a pod that generates a response to a request) and (b) which pod is an unhealthy pod (e.g., a pod that does not generate a response to a request, an over-provisioned pod, a pod that is slowing down in terms of performance, a pod's resource utilization value is exceeding a predetermined maximum resource utilization value threshold, etc.); (iii) based on (ii), manage health of a pod (and the worker node that hosts the pod) by implementing a policy (e.g., to manage an aggregate workload across pods, to manage SLA and QoS compliance as well as load balancing, etc.); (iv) identify health (e.g., a current status) of a pod (and the worker node that hosts the pod) based on average, minimum, and maximum resource utilization values (of each pod); (v) provide identified health of a pod (and the worker node that hosts the pod) to other entities (e.g., administrators, users of the clients, etc.); (vi) automatically react and generate alerts (e.g., a predictive alert, a proactive alert, a technical alert, etc.) if one of the predetermined maximum resource utilization value thresholds (associated with a pod or a worker node) is exceeded; (vii) add/remove computing resources to a worker node so that pods execute on the worker node may provide computer-implemented services to the corresponding users; (viii) manage computing resources of worker nodes and/or other resources (e.g., external resources) to provide computer-implemented services (e.g., where one or more pods may be instantiated using the resources of the worker nodes, external resources, and/or other types of computing devices); (ix) provide worker node composition services for users of clients (e.g., 120A, 120B, etc.); (x) generate a configuration template; and/or (xi) store (temporarily or permanently) the aforementioned data and/or the output(s) of the above-discussed processes in the CSS or etcd (of the master node (104A)).

In one or more embodiments, a configuration template may include (or specify), for example (but not limited to): a first hardware resource set of a first worker node (e.g., 106A), a second hardware resource set of a second worker node (e.g., 106B), a third hardware resource set of an external resource, etc. In one or more embodiments, the first hardware resource set may include hardware resources that are distinct from a second hardware resource and/or a third hardware resource set.

In one or more embodiments, information (e.g., resource utilization levels, logs, SLA and QoS compliance data from each pod, load balancing between worker nodes, key performance metrics related to the worker nodes, etc.) may be obtained as they become available or by the master node manager (142) polling the corresponding worker node (e.g., by making an API call to a worker node manager (e.g., 150, FIG. 1.3) that is managing the corresponding worker node) for new information. Based on receiving the API call from the master node manager, the worker node manager may allow the master node manager to obtain the information. If necessary, the information may be shared with a user/administrator via a GUI of a corresponding client (e.g., 120A, 120B, etc.).

In one or more embodiments, the aforementioned information may be obtained (or streamed) continuously (without affecting production workloads of a corresponding worker node), as they are generated, or they may be obtained in batches, for example, in scenarios where (i) the master node manager (142) receives a failure score calculation request (e.g., a health check request), (ii) a corresponding worker node manager (e.g., 150, FIG. 1.3) accumulates the information and provides them to the master node manager at fixed time intervals, or (iii) the corresponding worker node manager stores the information in its storage (or in an external entity) and notifies the master node manager to access the information from its storage or from the external entity. In one or more embodiments, the information may be access-protected for the transmission from the worker node manager to the master node manager, e.g., using encryption.

As described above, the master node manager (142) may monitor service performance and resource utilization of a worker node (for, for example, troubleshooting and optimization) by obtaining/monitoring telemetry data about the worker node's computing resources from a corresponding worker node manager (e.g., 150, FIG. 1.3). In one example, the master node manager (142) may, e.g.: (i) monitor actions being performed, and computation power being consumed by each worker node, (ii) monitor communications being sent or received by each worker node by intercepting them, (iii) based on the intercepted communications, determine utilization rates of one or more resources by a worker node, and/or (iv) store (temporarily or permanently) the resource utilization rates (e.g., including estimates, measurements, etc.) in the CSS or etcd (of the master node (104A)).

In one or more embodiments, while monitoring, the master node manager (142) may need to, for example (but not limited to): inventory one or more components of each worker node, obtain a type and a model of a component of a worker node, obtain a version of firmware or other code executing on a worker node, obtain information regarding a hardware component or a software component of a worker node that may be allocated to a worker node, obtain information specifying each worker node's interaction with one another, etc.

In one or more embodiments, in order to manage the health of worker nodes (e.g., 106A, 106B, etc.) (in particular, the health of unhealthy worker nodes) and resolve bottlenecks without affecting the operation of the cluster (e.g., 102, FIG. 1.1), the master node manager (142) may take one or more preventive (and proactive) actions. A preventive action may be, for example (but not limited to): performing workload redistribution among worker nodes (e.g., high-performance load balancing) (for example, to prevent workload mismatch between worker nodes and to manage overall performance of the cluster), reducing the quantity of unnecessary REST API calls (for example, to prevent unnecessary memory utilization and to improve the likelihood that the unhealthy worker nodes are healthy again), modifying (e.g., adding, removing, etc.) resources allocated to a worker node (for example, to ensure highly available worker nodes and pods), modifying a predetermined maximum resource utilization value threshold (e.g., increasing a predetermined maximum CPU utilization value threshold from 70% to 85% so that Worker Node A may take more workloads), testing (in terms of resource utilization and workload assignment) a newer worker node that will be added into the cluster (e.g., 102, FIG. 1.1) before causing an impact on the cluster, etc.

Further, in one or more embodiments, the master node manager (142) may receive one or more composition requests (e.g., a worker node composition request) from one or more users. A composition request may indicate a desired outcome such as, for example, execution of one or more applications (or pods) on a worker node, providing of one or more services (e.g., by a pod), etc. The master node manager (142) may translate (using an intent based model) the composition request into corresponding quantities of computing resources necessary to be allocated (e.g., to a composed worker node) to satisfy a user's intent expressed in the composition request. Once the quantities of computing resources are obtained, the master node manager (142) may allocate computing resources of worker nodes (e.g., 106A, 106B, etc.) to meet the identified quantities of computing resources by instructing processors of the worker nodes to prepare and present resources (e.g., hardware resource sets) of the worker nodes to compute resource sets of the worker nodes.

For example, the master node manager (142) may utilize an outcome based computing resource requirements lookup table to match an expressed intent to resources to be allocated to satisfy that intent. The outcome based computing resource requirements lookup table may specify the type, make, quantity, method of management, and/or other information regarding any number of computing resources that when aggregated will be able to satisfy a corresponding intent. The master node manager may identify resources for allocation to satisfy composition requests via other methods without departing from the scope of the invention.

Additionally, the master node manager (142) may instruct the processors (of one or more worker nodes) to manage the hardware resources of the hardware resource sets in accordance with one or more models (e.g., data integrity, security, etc.). However, when the processors present these resources to the compute resource sets, the processors may present the resources as bare metal resources while managing them in more complex manners. By doing so, embodiments of the invention may provide a framework for unified security, manageability, resource management/composability, workload management, and distributed system management by use of processors.

As discussed above, computing resources of a worker node (e.g., 106A, 106B, etc.) may be divided into three logical resource sets (e.g., a compute resource set, a control resource set, and a hardware resource set). By logically dividing the computing resources of a worker node into these resource sets, different quantities and types of computing resources may be allocated to each worker node and/or a composed worker node. Further, dividing the computing resources in accordance with the three set model may enable different resource sets to be differentiated (e.g., given different personalities) to provide different functionalities. Consequently, worker nodes may be composed on the basis of desired functionalities rather than just on the basis of aggregate resources to be included in the composed worker nodes.

As discussed above, to instantiate a composed worker node, the worker nodes (e.g., 106A, 106B, etc.) may include at least three resource sets including a control resource set. The control resource set may include a processor, in which the corresponding processor of each worker node may coordinate with the master node manager (142) to enable a composed worker node to be instantiated. For example, a processor of a worker node may provide telemetry data regarding computing resources of the worker node, may perform actions on behalf of the master node manager to aggregate computing resources together, may organize the performance of duplicative workloads to improve the likelihood that workloads are completed, and/or may provide services that unify the operation of a composed worker node.

In one or more embodiments, a processor of a worker node (e.g., 106A) may mediate presentation of the computing resources provided by the hardware resources (of the worker node) to a computing resource set (e.g., as bare metal resources). When doing so, the processor may provide a layer of abstraction that enables the hardware resources to be, for example, virtualized, emulated as being compatible with other systems, and/or directly connected to the compute resource set (e.g., pass through). Consequently, computing resources of the hardware resources may be finely, or at a macro level, allocated to different composed worker nodes.

In one or more embodiments, composition requests may specify computing resource allocations using an intent based model (e.g., intent based requests received from users). For example, rather than specifying specific hardware resources/devices (or portions thereof) to be allocated to a particular compute resource set to obtain a composed worker node, a composition request may only specify that a composed worker node is to be instantiated having predetermined characteristics, that a composed worker node will perform certain workloads or execute certain applications, and/or that the composed worker node be able to perform one or more predetermined functionalities. In such a scenario, the master node manager (142) may decide how to instantiate a composed worker node (e.g., which resources to allocate, how to allocate the resources (e.g., virtualization, emulation, redundant workload performance, data integrity models to employ, etc.), etc.).

In one or more embodiments, composition requests may specify computing resource allocations using an explicit model. For example, a composition request may specify (i) computing resources to be allocated, (ii) the manner of presentation of those resources (e.g., emulating a particular type of device using a virtualized resource vs. path through directly to a hardware component), and/or (iii) compute resource set(s) to which each of the allocated resources are to be presented. In addition to specifying computing resource allocations, a composition request may also specify, for example, applications (or pods) to be hosted by a composed worker node, security models to be employed by the composed worker node, communication models to be employed by the composed worker node, services to be provided by the composed worker node, user/entity access credentials for use of the composed worker node, and/or other information usable to place the composed worker node into states where the composed worker node provides desired computer-implemented services.

Further, to cooperate with processors (of worker nodes), the master node manager (142) may obtain telemetry data regarding the computing resources of any number of worker nodes and/or external resources that are available for allocation. The master node manager may aggregate this data in a telemetry data map that may be subsequently used to identify resources of any number of worker nodes and/or external resources to satisfy composition requests (e.g., instantiate one or more worker nodes to meet the requirements of the composition requests).

As a composed worker node is instantiated, the master node manager (142) may add information reflecting resources allocated to the composed worker node, workloads being performed by the composed worker node, and/or other types of information to a composed infrastructure map. The master node manager may utilize this information to, for example, decide whether computing resources should be added to or removed from one or more worker nodes (e.g., 106A, 106B, etc.). Consequently, computing resources may be dynamically re-provisioned over to meet changing workloads imposed on the worker nodes.

One of ordinary skill will appreciate that the master node manager (142) may perform other functionalities without departing from the scope of the invention. The master node manager (142) may be implemented using hardware (e.g., an integrated circuit), software, or any combination thereof (e.g., a physical computing system).

As being a fault-tolerant database, etcd may store and/or manage critical data (e.g., configuration data, state data, metadata, etc.) that the cluster (e.g., 102, FIG. 1.1) needs to keep providing its functionalities. The etcd may store unstructured and/or structured data such as, for example, a telemetry data map, a composed infrastructure map, an infrastructure utilization map, a health status repository, and a composable asset map. These data structures may be maintained by, for example, the master node manager (142). For example, the master node manager may add, remove, and/or modify information included in these data structures to cause the information included in these data structures to reflect the state of any number of worker nodes, external resources, and/or composed worker nodes.

In one or more embodiments, the unstructured and/or structured data (or data structures) may include (or specify), for example (but not limited to): an identifier of a container image, a number of container replicas that needs to be executed per worker node, a number of worker nodes across the cluster (e.g., 102, FIG. 1.1), a number of pods across the cluster, a number of pods per worker node, network latency, logon time, a frame rate, a number of dropped packets, storage I/O latency, end-to-end user latency, a minimum user count supported by a worker node, a maximum user count supported by a worker node, a maximum network latency threshold that needs to be met by a worker node, a maximum dropped packets threshold that needs to be met by a worker node, a maximum storage I/O latency threshold that needs to be met by a worker node, a maximum end-to-end I/O user latency threshold that needs to be met by a worker node, a rule to provide an always-access guarantee to computing resources (e.g., especially to certain resources when contention over subscription occurs) for a user/tenant with a user access level/tier of 9/10, etc.

Any of these data structures may be implemented using any combination and quantity of, for example, lists, tables, unstructured data, databases, etc. While illustrated as being stored locally, any of these data structures may be stored remotely and may be distributed across any number of devices without departing from the invention. Further, while the etcd has been illustrated and described as including a limited number and type of data, the etcd may store additional, less, and/or different data without departing from the scope of the invention.

In one or more embodiments, the cluster configuration repository (140) may represent a data store dedicated to consolidation of cluster (e.g., 102, FIG. 1.1) configuration information. Cluster configuration information may refer to data that details the state of the cluster at any given point of time. By way of example, cluster configuration information may include (but not limited to): information identifying one or more worker nodes that, at least in part, establish the cluster, information identifying various workloads implemented and/or containers executing across the cluster, and/or information identifying which worker nodes may be hosting which workload(s) and/or container(s).

Further, the cluster configuration repository (140) may store data structures including, for example (but not limited to): composed system data, a resource map, a computing resource health data, a request ruleset, a response ruleset, etc. In one or more embodiments, the composed system data may be implemented using one or more data structures that includes information regarding composed worker nodes. For example, the composed system data may specify identifiers of composed worker nodes and resources that have been allocated to the composed worker nodes.

The composed system data may also include information regarding the operation of the composed worker nodes. The information (which may be utilized to manage the operation of the composed worker nodes) may include (or specify), for example (but not limited to): workload performance data, resource utilization rates over time, management models employed by the master node manager (142), etc. For example, the composed system data may specify information regarding duplicative data stored for data integrity purposes, redundantly performed workloads to meet high-availability service requirements, encryption schemes utilized to prevent unauthorized access of data, etc.

In one or more embodiments, a request ruleset may specify (or include), for example (but not limited to): a request (e.g., received from a user) decryption rule, a request authentication rule (which may be utilized by the master node manager (142) to validate a request), a type of an allowable network communication/protocol between an entity and components of the cluster (e.g., 102, FIG. 1.1), a particular header that needs to be included in an intercepted request, a smart contract that defines under what conditions a request should be granted, a smart contract that defines under what conditions data a request should be transferred to a worker node, one or more rules/policies for detecting and blocking illegitimate requests and application-based attacks, one or more rules/policies to protect components of the cluster against various classes and types of Internet-based vulnerabilities, etc.

In one or more embodiments, a response ruleset may include (or specify), for example (but not limited to): an attribution rule (e.g., a type/format of an asset (e.g., a ".pdf" file, a ".doc" file, a ".jpeg" file, etc.), a size of an asset, a content of an asset (e.g., a legal document, an engineering design document, etc.), an identifier of an asset, etc.), an asset sensitivity/criticality threshold that needs to be applied for all outgoing network traffic, etc. In one or more embodiments, the authentication related rules included in the response ruleset and request ruleset may be the same across all clusters of an organization to perform a uniform and successful authentication process.

In one or more embodiments, the resource map may include information regarding resources of worker nodes (e.g., 106A, 106B, etc.). For example, the resource map may specify the type and/or quantity of computing resources available for allocation and/or that are already allocated to a composed worker node. The resource map may be used to provide data to management entities, such as administrators.

In one or more embodiments, the computing resource health data may include information regarding the health of hardware devices that provide computing resources to composed worker nodes. For example, the computing resource health data may specify operation errors, health state information, temperature, and/or other types of information indicative of the health of hardware devices.

The computing resource health data may specify the health states of hardware devices via any method. For example, the computing resource health data may indicate whether, based on the aggregated health information, that the hardware devices are or are not in compromised states. A compromised health state may indicate that the corresponding hardware device has already or is likely to, in the future, be no longer able to provide the computing resources that it has previously provided.

The health state determination may be made via any method based on the aggregated health information without departing from the scope of the invention. For example, the health state determination may be made based on heuristic information regarding previously observed relationships between health information and future outcomes (e.g., current health information being predictive of whether a hardware device will be likely to provide computing resources in the future).

The aforementioned data structures may be maintained by, for example, the master node manager (142). For example, the master node manager may add, remove, and/or modify information included in the data structures to cause the information included in the data structures to reflect the state of the composed worker nodes. The data structures may be implemented using, for example, lists, tables, unstructured data, databases, etc. While illustrated as being stored locally, the data structures may be stored remotely and may be distributed across any number of devices without departing from the scope of the invention.

While the cluster configuration repository (140) has been illustrated and described as including a limited number and type of data, the cluster configuration repository (140) may store additional, less, and/or different data without departing from the scope of the invention.

One of ordinary skill will appreciate that the cluster configuration repository (140) may perform other functionalities without departing from the scope of the invention. The cluster configuration repository (140) may be implemented using one or more physical storage devices and/or media representative of data storage on the master node (104A). These one or more physical storage devices and/or media may or may not be of the same type. In one or more embodiments, the cluster configuration repository (140) may be implemented using persistent (i.e., non-volatile) data storage. Examples of persistent data storage include (but not limited to): optical storage, magnetic storage, NAND Flash memory, NOR Flash memory, MRAM), ST-MRAM, PCM, etc.

In one or more embodiments, the backup/restore manager (144) may be a manager that is dedicated to the instantiation of agentless backup and/or restore operations across the cluster (e.g., 102, FIG. 1.1). To that extent, the backup/restore manager (144) may perform the following functionalities (but not limited to): issuing backup (or restore) workload requests (to the master node interface (146) based on proactive (or reactive) disaster recovery programming, receiving backup (or restore) workload metadata following implementation and completion of the backup (or restore) workload, deriving analytics using at least received backup (or restore) workload metadata, receiving event entries from an event entry coordinator, storing historical event entries in the etcd, etc.

One of ordinary skill will appreciate that the backup/restore manager (144) may perform other functionalities without departing from the scope of the invention. The backup/restore manager (144) may be implemented using hardware, software, or any combination thereof.

In one or more embodiments, the master node interface (146) may represent an application programming interface (API) (e.g., a communication channel, an entry point to the cluster, etc.) for the cluster (e.g., 102, FIG. 1.1). To that extent, the master node interface (146) may employ a set of subroutine definitions, protocols, and/or hardware/software components for enabling communications between the cluster and external entities (e.g., the clients (e.g., 120A, 120B, etc.)). The master node interface (146) may also facilitate communications between the master node (104A) and one or more worker nodes (e.g., 106A, 106B, etc.).

In one or more embodiments, the master node interface (146) may perform the following additional functionalities (but not limited to): maintaining and/or updating the cluster configuration repository (140), provisioning persistent volumes (described above) based on received volume generation requests, invoking the master node manager (142), deploying (in conjunction with the master node manager) workloads to one or more worker nodes (e.g., 106A, 106B, etc.), receiving and validating (in conjunction with the master node manager) workload requests from external entities and/or the backup/restore manager (144), etc.

One of ordinary skill will appreciate that the master node interface (146) may perform other functionalities without departing from the scope of the invention. The master node interface (146) may be implemented using hardware, software, or any combination thereof.

While the master node (104A) has been illustrated and described as including a limited number of specific components, the master node (104A) may include additional, fewer, and/or different components than those mentioned above without departing from the scope of the invention. In one or more embodiments, the cluster (e.g., 102, FIG. 1.1) may host multiple master nodes, making a master node highly available; that is, if any master node fails or is shut down (which may directly affect applications/pods being executed on one or more worker nodes), or one of components of a master node fails, the cluster will still work properly.

In one or more embodiments, the master node manager (142), the cluster configuration repository (140), the backup/restore manager (144), and the master node interface (146) may be utilized in isolation and/or in combination to provide the above-discussed functionalities. These functionalities may be invoked using any communication model including, for example, message passing, state sharing, memory sharing, etc. By doing so, the master node (104A) may address issues related to data security, integrity, and availability proactively.

Further, some of the above-discussed functionalities may be performed using available resources or when resources of the nodes are not otherwise being consumed. By performing these functionalities when resources are available, these functionalities may not be burdensome on the resources of the nodes and may not interfere with more primary workloads performed by the nodes.

While FIG. 1.2 shows a configuration of components, other system configurations may be used without departing from the scope of the invention.

Turning now to FIG. 1.3, FIG. 1.3 shows a diagram of a worker node (e.g., 106A) and a portion of the system (e.g., 100, FIG. 1.1) (from a different perspective) in accordance with one or more embodiments of the invention. The worker node (106A) includes a worker node manager (150), a container runtime (152), a cluster persistent volume mount (160), and a backup persistent volume mount (162). The worker node (106A) may include additional, fewer, and/or different components without departing from the scope of the invention. Separately, FIG. 1.3 also shows one or more components (a backup persistent volume (164) and a cluster persistent volume (166)) hosted by the persistent volume pool (108). Each component may be operably connected to any of the other component via any combination of wired and/or wireless connections. Each component illustrated in FIG. 1.3 is discussed below.

In one or more embodiments, the worker node (106A) may represent a physical computing device dedicated to the execution of workloads presented to the cluster (e.g., 102, FIG. 1.1) To that extent, the worker node (106A) may perform the following functionalities (but not limited to): receiving workloads deployed by the master node (104A), implementing received workloads using one or more containers (e.g., 156A, 158A, etc.), providing computing resources to support the execution of containers, monitoring and reporting container status(es), aggregating metrics and/or metadata pertinent to cluster analytics, implementing agentless backup/restore operations (in conjunction with the backup/restore manager (e.g., 144, FIG. 1.2)), etc.

In one or more embodiments, the worker node manager (150) may include functionality to, e.g.: (i) interact with the master node (104A) (e.g., receiving workloads sought for implementation, reporting worker node pertinent state information, etc.); (ii) manage the lifecycle of persistent volume mounts (e.g., the cluster persistent volume mount (160) and the backup persistent volume mount (162)); (iii) manage and/or invoke the container runtime (152) to implement received workloads (sought for implementation) and aggregate workload metadata; (iv) set the correct resource requests and limits for the containers (e.g., if the requests are too small, one or more pods (e.g., 154A, 154B, etc.) may start failing); (v) periodically review resource requests and limits for various workloads and compare them against what was actually used; (vi) manage (in conjunction with the master node manager (e.g., 142, FIG. 1.2)) a group of replicas of a particular pod to make sure there are always the specified number of replicas in the cluster; (vii) in conjunction with the master node manager, allow the generation, maintenance, scheduling, and/or configuration of one or more containers (e.g., 156A, 158A, etc.) by using computing resources assigned to the worker node (106A); (viii) in conjunction with the master node manager, keep track of one or more pods and assign an IP address to each pod and/or service; and/or (ix) store (temporarily or permanently) the aforementioned data and/or the output(s) of the above-discussed processes in the CSS.

One of ordinary skill will appreciate that the worker node manager (150) may perform other functionalities without departing from the scope of the invention. The worker node manager (150) may be implemented using hardware, software, or any combination thereof.

In one or more embodiments, the container runtime (152) may represent a computer program dedicated to the implementation of workloads (by hosting one or more pods (e.g., Pod A (154A), Pod B (154B), etc.)). To that extent, the container runtime (152) may perform the following functionalities (but not limited to): at the behest of the worker node manager (150), obtaining workloads sought for implementation therefrom; implementing obtained workloads through the lifecycle management of one or more pods; allocating worker node (106A) resources to support the implementation of obtained workloads; issuing container image requests to the container registry (discussed above in reference to FIG. 1.1) and receiving container images therefrom; reporting state information pertinent to one or more pods to the worker node manager; aggregating workload metadata for the worker node manager; executing one or more containers; etc. One of ordinary skill will appreciate that the container runtime (152) may perform other functionalities without departing from the scope of the invention.

In one or more embodiments, a pod (e.g., 154A, 154B, etc.) may refer to a logical collection of one or more containers (e.g., Container A1 (156A) hosted by Pod A (154A), Container A2 (158A) hosted by Pod N (154N), etc.) or the smallest unit in Kubernetes with shared storage, network resources, and a specification for how to execute the containers (e.g., a pod is an abstraction layer on top of one or more containers). Any given pod (e.g., 154A, 154B, etc.) may be directed to the execution of a given workload, and any given container (e.g., 156A, 158A, etc.) of the given pod may be directed to the execution of any subset of the required tasks (i.e., processes or instances) associated with the given workload (where any given container may have a short lifespan). Each pod may communicate with another pod using its "internal" IP address in an internal network exist in the cluster (e.g., 102, FIG. 1.1).

In one or more embodiments, a pod set (or "pods") may refer to a logical collection of one or more pods (e.g., 154A, 154B, etc.), which may enact the implementation and completion of a given workload. That is, when a given workload is implemented, one or more pods may be generated to perform and ensure the successful completion of the task(s) associated with the given workload.

The generated pod(s) (e.g., 154A, 154B, etc.) may either execute these task(s) as a non-parallel (i.e., serial) process or as multiple parallel processes. As a non-parallel process, any single pod (e.g., 154A, 154B, etc.) may be instantiated and execute these task(s) at any given time. When the instantiated pod (e.g., 154A, 154B, etc.) fails, for any number of reasons, a newer pod may be instantiated to continue execution of the task(s). Should this newer pod also fail, another new pod may be instantiated to take its place. This non-parallel processing of the task(s) continues until the task(s) associated with the given workload successfully complete.

On the other hand, as a parallel process, any set of two or more pods (e.g., 154A, 154B, etc.) may be instantiated and execute the above-mentioned task(s) at any given time. Successful completion of the task(s) may be defined through a different metric (e.g., a specified number of successful completions by an equal specified number of pods). Each successful completion of the task(s) may be tracked until the specified number of successful completions is reached, where at that point, the parallel processing of the task(s) officially complete and terminate. When any given pod (e.g., 154A, 154B, etc.) fails, one or more newer pods may be instantiated in place of the failed pod.

By way of a simplified example, a workload may be defined through three different tasks (or processes), e.g., a main process, which may handle the bulk of the workload, and two assistant processes, which may focus on the performance of minor responsibilities. In one embodiment, a first container (e.g., 156A) may be instantiated to execute the main process, while a second container (e.g., 156N) may be instantiated to execute the two assistant processes. In another embodiment, three separate containers may be instantiated to execute each different task (or process), respectively. Further, any given container (e.g., 156A, 158A, etc.), like any given pod (e.g., 154A, 154B, etc.), may fail for any number of reasons. When a failure transpires, a newer container may be instantiated to continue the subset of tasks (or processes) for which the failed container had been responsible.

In one or more embodiments, a pod (e.g., 154A, 154B, etc.) may not be aware of (i) local and/or remote nodes and/or pods in the cluster (e.g., 102, FIG. 1.1) and/or (ii) any other cluster-related information within another (local or remote) pod and/or node (so that users may move the cluster to another form factor at a later point-in-time and the pods may operate in a truly abstracted manner). Said another way, each of the pods that executes on the cluster is not required to have (or be aware of) any infrastructure knowledge (e.g., local/remote pod placements/deployments (on the same/different nodes), pod affinity mechanisms, local/remote node deployments, node affinity mechanisms, etc., across the cluster) about the cluster.

As used herein, a container may refer to a standalone, lightweight virtualization environment (e.g., an independent/isolated software instance that is packed up by services, along with libraries and dependencies) that allows for executing an application or an OS, within the container, without the overhead of executing a hypervisor (i.e., a computer program dedicated to the management of virtualization objects such as VMs) over the underlying hardware/software components of the container's host (e.g., 106A). In one or more embodiments, a container (e.g., 156A, 158A, etc.) may be executing in "user space" (e.g., a layer of software that utilizes low-level system components for the execution of one or more applications) of an OS of the worker node (106A). Further, a container may only aware of a network interface with an IP address, a gateway, a routing table, one or more domain name system (DNS) services, and/or other networking details. Each of the containers may be performing similar or different processes at the same time.

In one or more embodiments, the cluster persistent volume mount (160) may represent a logically or virtually abstracted component that serves as an interface to a given cluster persistent volume (166) (e.g., 109E, FIG. 1.1), which may have been provisioned from the persistent volume pool (108) of the cluster (e.g., 102, FIG. 1.1). In turn, a cluster persistent volume (166) may represent a persistent volume that is backed by (or interfaces with) the CSS. Interfacing between the cluster persistent volume (166) and the CSS may be managed by the CSS plug-in. Further, the cluster persistent volume mount (160) may point to a specific directory (or set of directories) representative of disk location(s) on the CSS whereat relevant metadata and/or data, to one or more pods (e.g., 154A, 154B, etc.), may reside.

In addition, though one cluster persistent volume mount (160) is shown, multiple cluster persistent volume mounts may be instantiated on the worker node (106A). In such a scenario, each cluster persistent volume mount may point to a different subset of directories on the CSS, which may be accessed by any pod or pod sets.

In one or more embodiments, the backup persistent volume mount (162) may represent a logically or virtually abstracted object that serves as an interface to a given backup persistent volume (164) (e.g., 109D, FIG. 1.1), which may have been provisioned from the persistent volume pool (108) of the cluster (e.g., 102, FIG. 1.1). In turn, a backup persistent volume (164) may represent a persistent volume that is backed by (or interfaces with) the BSS (116). Interfacing between the backup persistent volume (164) and the BSS (116) may be managed by the BSS plug-in (e.g., 112, FIG. 1.1). Further, the backup persistent volume mount (162) may point to a specific directory (or set of directories) representative of disk location(s) on the BSS (116) whereat relevant metadata and/or data, to one or more pods (e.g., 154A, 154B, etc.), may reside.

In addition, though one backup persistent volume mount (162) is shown, multiple backup persistent volume mounts may be instantiated on the worker node (106A). In such a scenario, each backup persistent volume mount may point to a different subset of directories on the BSS (116), which may be accessed by any pod or pod sets.

While the worker node (106A) has been illustrated and described as including a limited number of specific components, the worker node (106A) may include additional, fewer, and/or different components than those mentioned above without departing from the scope of the invention. In one or more embodiments, the cluster (e.g., 102, FIG. 1.1) may host multiple worker nodes, making a worker node highly available; that is, if any worker node fails or is shut down (which may directly affect applications/pods being executed), or one of components of a worker node fails, the cluster will still work properly.

In one or more embodiments, the worker node manager (150), the container runtime (152), the cluster persistent volume mount (160), and the backup persistent volume mount (162) may be utilized in isolation and/or in combination to provide the above-discussed functionalities. These functionalities may be invoked using any communication model including, for example, message passing, state sharing, memory sharing, etc. By doing so, the worker node (106A) may address issues related to data security, integrity, and availability proactively.

Further, some of the above-discussed functionalities may be performed using available resources or when resources of the nodes are not otherwise being consumed. By performing these functionalities when resources are available, these functionalities may not be burdensome on the resources of the nodes and may not interfere with more primary workloads performed by the nodes.

While FIG. 1.3 shows a configuration of components, other system configurations may be used without departing from the scope of the invention.

Turning now to FIG. 2, FIG. 2 shows a diagram of internal network traffic in a cluster in accordance with one or more embodiments of the invention. As indicated, (i) Worker Node A (202A) hosts multiple pods (e.g., Pod A1 (204A), Pod B1 (204B), etc.), (ii) Worker Node B (202B) hosts multiple pods (e.g., Pod A2 (206A), Pod B2 (206B), etc.), and (iii) Worker Node C (202C) hosts multiple pods (e.g., Pod A3 (208A), Pod B3 (208B), etc.). Further, each pod (e.g., Pod A1) is connected to Service A (210) and Service B (212) via wired and/or wireless connections. Each of Worker Node A-C may be an example of a worker node discussed above in reference to FIGS. 1.1 and 1.3.

As used herein, a "service" may refer to a method for exposing a network application that is executing as one or more pods (e.g., 204A, 204B, etc.) in the cluster (e.g., 102, FIG. 1.1). A service (e.g., 210, 212, etc.) may be generated by the master node manager (e.g., 142, FIG. 1.2) and include functionality to, e.g.: (i) make one or more pods available in an external network so that one or more clients may interact with the pods; (ii) with the help of a service API (e.g., an abstraction to help exposing a set of pods over an internal/external network, an ingress, etc.), define a set of network endpoints (e.g., pods) along with a network traffic policy about how to make the pods accessible; (iii) support different protocols (e.g., TCP, UDP, etc.) for communication and metadata/data transfer; (iv) support multiple port definitions (where each definition may have the same protocol or a different protocol); (v) publish a port and an IP address to a pod so that the pod may connect/access to the service using the port and IP address (when necessary); (vi) be a static/permanent IP address that can be attached to a pod; (vii) be independent from a lifecycle of a pod; and/or (viii) act as a proxy or a load balancer (e.g., the service may forward a request to a pod that is least busy), and forward requests to one or more pods (via a single and durable IP address or a DNS identifier).

As described above, each pod (e.g., 204A, 208A, etc.) may have a unique IP address and a range of ports (to allocate to its containers), in which the IP address is reachable from all other pods in the cluster (e.g., 102, FIG. 1.1). When a pod (e.g., 204A) is generated (by the master node manager (e.g., 142, FIG. 1.2)) on a worker node (e.g., 202A), the pod may get its own network namespace and a virtual Ethernet connection to connect to the underlying internal/external network.

In one or more embodiments, a set of pods (e.g., 204A, 204B, etc.) targeted by a service (e.g., 210, 212, etc.) may be determined by a selector that is defined by the master node manager (e.g., 142, FIG. 1.2). Further, if a workload is received (from a client (e.g., 120A, FIG. 1.1)) via hypertext transfer protocol (http), the ingress (which exposes a service to public/external network such that the ingress may receive a request from a client and transfer the request to a corresponding service (which then forwards the request to a corresponding pod)) may manage how that web-based network traffic reaches to a corresponding pod (as indicated, the ingress is not a service type, but the ingress may act as the entry point for the cluster (e.g., 102, FIG. 1.1)).

As described above, the master node manager (e.g., 142, FIG. 1.2) may generate, view, and/or modify service definitions. For example, each of a set of pods may listen on TCP 9376 and may be labelled as "MyApp" (e.g., a label (or a key-value pair) may be used for sending requests from a service to an appropriate endpoint). In this example, (i) the master node manager may define a service (e.g., 210, 212, etc.) to publish that TCP listener, (ii) the defined service may be named as "MyService" with an associated IP address (e.g., IP Address A, which is different from endpoint IP addresses), and (iii) "MyService" will target TCP port 9376 on any pod with the "MyApp" label. As indicated, a port definition of a pod may be referenced in a "target attribute" of a service. Further, "IP Address A" may be a cluster-internal IP address, which means IP Address A may only be reachable from within the cluster (e.g., 102, FIG. 1.1). As yet another example, if a DNS has been enabled throughout the cluster, then all pods may automatically be able to resolve services by their DNS names.

In one or more embodiments, Service B (212) may operate based on a service internal traffic policy (e.g., ".spec.internalTrafficPolicy: Local"), in which Service B's policy may specify internal traffic restrictions to only route internal network traffic to "target" endpoints within a worker node the traffic originated from. As used herein, "internal traffic (or "internal network traffic")" refers to the traffic originated from pods in the current cluster (e.g., 102, FIG. 1.1). Further, Service A (212) may operate based on a second service internal traffic policy (e.g., ".spec.internalTrafficPolicy: Cluster" or ".spec.internalTrafficPolicy: N/A"), in which Service A's policy may specify routing internal traffic to any available "target" endpoints with the cluster.

Additional details of a service are described below in reference to FIG. 3.

FIG. 3 shows a method for managing internal network traffic in a cluster (e.g., 102, FIG. 1.1) in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 3, the method shown in FIG. 3 may be executed by, for example, the above-discussed pods (e.g., 204A, 206N, etc., FIG. 2) and services (e.g., 210, 212, etc., FIG. 2). Other components of the system (100) illustrated in FIG. 1.1 may also execute all or part of the method shown in FIG. 3 without departing from the scope of the invention.

In Step 300, a first pod (or a "source" pod such as a "data object service (DOB)" pod) (e.g., 204A, FIG. 2) receives a valid/granted request (e.g., a volume generation request, a data backup request, a data discovery request, etc.) from a requesting entity (e.g., a user/customer of Client A (e.g., 120A, FIG. 1.1), an administrator terminal, the master node manager (e.g., 142, FIG. 1.2), a worker node manager (e.g., 150, FIG. 1.3), etc.) via any technique for receiving data (e.g., over a network (e.g., 130, FIG. 1.1), manually, etc.), in which the request may include/specify metadata and/or data.

In one or more embodiments, metadata and/or data may include (or specify), for example (but not limited to): volume configuration information (e.g., may detail attribute requirements (e.g., a storage size, an access mode (e.g., read-only accessibility by a single worker node, read-write accessibility by multiple worker nodes, etc.)) for the to-be-provisioned persistent volume, a set of performance requirement (e.g., latency, throughput, etc.), etc.), an identifier of a data item, a size of the data item, an identifier of a user who initiated the request, an identifier of a client used by the user, a file system path in which content of the data item was stored, a user activity performed on the data item, a type of the request, a size of the request, an identifier of a hardware component that executes on the client, deduped file system metadata of the client (e.g., an identifier of a file, an identifier of a patent folder containing the file, a size of the file, an access control list of the file, etc.) that is generated by the source pod after receiving the request, fingerprint information associated with the deduped file system metadata, historical sensor data/input (e.g., visual sensor data, audio sensor data, electromagnetic radiation sensor data, temperature sensor data, humidity sensor data, corrosion sensor data, etc., in the form of text, audio, video, touch, and/or motion) and its corresponding details, a cumulative history of user activity records obtained over a prolonged period of time, a backup history documentation of a workload, a version of an application, a product identifier of the application, recently obtained customer/user information (e.g., records, credentials, etc.) of a user, a restore history documentation of a workload, a workload that needs to be performed, a type of a workload (e.g., non-parallel processing, parallel processing, etc.), etc.

In response to receiving the request (and the associated metadata and/or data), as part of that request, and/or in any other manner, the source pod identifies a physical (or logical) "network" port of a first service (e.g., Service B (e.g., 212, FIG. 2)) to connect to (e.g., to communicate with, to interface with, etc.) the first service. The source pod may identify the port of Service B via Service B's permanent IP address and/or an internal DNS identifier assigned to Service B. For example, in order to establish an internal network-enabled connection between the source pod and Service B, the source pod's corresponding port and Service B's corresponding port should be open (e.g., active, ready to communicate, etc.). Otherwise, Service B may not communicate with the source node in order to transfer metadata/data and/or coordinate some activity.

As used herein, a "port" may refer to a logical communication endpoint that allows software to associate data received at a particular port as being a particular type of data and/or associated with a particular type of process.

In Step 302, upon identifying, the source pod connects to the port of Service B in order to perform, for example, request related operations.

In Step 304, Service B makes a determination as to whether a related local pod (e.g., a "target" pod that exists on the same worker node as the source node, Pod N1 (e.g., 204N, FIG. 2), a "key-value store (KVS)" pod, etc.) is available. Accordingly, in one or more embodiments, if the result of the determination is YES, the method proceeds to Step 306. If the result of the determination is NO, the method alternatively proceeds to Step 310.

In one or more embodiments, upon receiving the communication from the source pod, Service B checks/invokes/pings the related local pod (e.g., via the related local pod's IP address and/or port) to infer a status (e.g., busy, unavailable, available, online, offline, does not have enough computing resources to perform an extra workload, down, etc.) of the related local pod. In response to being invoked, the related local pod (i) may send a notification to Service B indicating its status (e.g., available, online, busy, restarting, etc.), or (ii) may not send a notification to Service B (which indicates that the related local pod is offline, for example, because of an ongoing software upgrade process or a connection error).

In Step 306, as a result of the determination in Step 304 being YES, the source node receives a notification (from Service B) indicating that Service B is ready to receive internal network traffic (e.g., at least metadata and/or data discussed above in reference to Step 300).

In Step 308, upon being informed in Step 306, the source pod sends (using any method) the internal network traffic (which may include one or more workloads/operations sought to be implemented) to Service B. In one or more embodiments, based on its service internal traffic policy (described above in reference to FIG. 2), Service B sends/forwards/routes the internal network traffic (e.g., I/O operations) to the related local pod to manage the internal network traffic. For example, after receiving the internal network traffic, the related local pod may store the deduped file system metadata.

Thereafter, the related local pod may send a notification to Service B indicating that, for example, the workloads (assigned to the related local pod) are successfully completed. Subsequently, Service B may inform the master node manager, in which the master node manager may, via a GUI of the corresponding client, further notify the user (whom had issued the request (in Step 300)) about the successfully completed request. In response to being informed, the master node manager may invoke a container runtime (e.g., 150, FIG. 1.3) of the corresponding worker node (e.g., the worker node that hosts the related local pod) to obtain workload-related metadata (e.g., a job report) aggregated while the related local pod was performing the workloads (so that, for example, the master node manager may perform analytics on the job report pertinent to (i) operations concerning health/state of the services, pods, and/or worker nodes across the cluster, and (ii) a profile of the user).

In one or more embodiments, the workload-related metadata (or metric) may include (or specify), for example (but not limited to): a storage size (or capacity) consumed on the BSS (e.g., 116, FIG. 1.1) by the related local pod, a completion timestamp encoding a date and/or time reflective of the successful completion of one of the workloads, a time duration reflecting the length of time expended for executing and completing one of the workloads, a deduplication ratio reflective of the deduplication efficiency of one of the workloads, a tenant/user identifier associated with a tenant, a backup retention period associated with one of the workloads, a backup directory pathname associated with one of the workloads, a set of jobs (e.g., a data backup job, a data restore job, etc.) that has been initiated, a status of a job (e.g., how many jobs are still active, how many jobs are completed, etc.), resource consumption of the related local pod, a number of other requests handled (in parallel) per minute (or per second, per hour, etc.), a number of errors encountered when handling one of the workloads, a disk I/O activity of the corresponding worker node, health status of the worker node, health status of the related local pod, a documentation that shows how the related local pod performs against an SLO and/or an SLA, etc.

In one or more embodiments, the method may end following Step 308.

In Step 310, as a result of the determination in Step 304 being NO and for a better internal network traffic management, the source node receives a second notification (from Service B) indicating that Service B is not ready to receive the internal network traffic (e.g., at least metadata and/or data discussed above in reference to Step 300), because a connection to the related local pod was failed (more specifically, the related local pod was unavailable/down).

In Step 312, upon receiving the second notification, the source pod automatically (or in any other manner) identifies a physical (or logical) "network" port of a second service (e.g., Service A (e.g., 210, FIG. 2)) to connect to the second service, in which the source pod automatically switches to Service A to continue performing the request (or any other I/O workload) received in Step 300. The source pod may identify the port of Service A via Service A's permanent IP address and/or an internal DNS identifier assigned to Service A.

In Step 314, upon identifying, the source pod connects to the port of Service A in order to continue, for example, request related operations.

In Step 316, the source node receives a third notification (from Service A) indicating that Service A is ready to receive the internal network traffic (e.g., at least metadata and/or data discussed above in reference to Step 300).

In Step 318, upon being informed/notified in Step 316, the source pod sends (using any method) the internal network traffic (which may include one or more workloads/operations sought to be implemented) to Service A. In one or more embodiments, based on its service internal traffic policy (described above in reference to FIG. 2), Service A sends/forwards/routes the internal network traffic to any remote "target" pod/endpoint deemed most appropriate (at the given time) to manage the internal network traffic. For example, after receiving the internal network traffic, the selected remote "target" pod (simply the "selected pod") may store the deduped file system metadata.

Thereafter, the selected pod may send a notification to Service A indicating that, for example, the workloads (assigned to the selected pod) are successfully completed. Subsequently, Service A may inform the master node manager (including an identifier of the selected pod), in which the master node manager may, via a GUI of the corresponding client, further notify the user (whom had issued the request (in Step 300)) about the successfully completed request. In response to being informed, the master node manager may invoke a container runtime (e.g., 150, FIG. 1.3) of the corresponding worker node (e.g., the worker node that hosts the selected pod) to obtain workload-related metadata (described above in reference to Step 308) aggregated while the selected pod was performing the workloads (so that, for example, the master node manager may perform analytics on the job report pertinent to (i) operations concerning health/state of the services, pods, and/or worker nodes across the cluster, and (ii) a profile of the user).

In one or more embodiments, the method may end following Step 318.

To further clarify embodiments of the invention, a non-limiting example use case is provided in FIGS. 4.1-4.3.

Start of Example

The example use case, illustrated in FIGS. 4.1-4.3, is not intended to limit the scope of the embodiments disclosed herein and is independent from any other examples discussed in this application. FIGS. 4.1-4.3 illustrate an example internal network traffic management procedure.

Turning now to FIG. 4.1, FIG. 4.1 shows a diagram of the example internal network traffic at "time 0". For the sake of brevity, not all components involved in the example internal network traffic may be discussed in FIG. 4.1.

Assume here that (i) Worker Node A (402A) hosts multiple pods (e.g., Pod A1 (404A), Pod B1 (404B), etc.), (ii) Worker Node B (402B) hosts multiple pods (e.g., Pod A2 (406A), Pod B2 (406B), etc.), (iii) each pod is connected to Service A (410) and Service B (412), and (iv) each pod is available (e.g., online).

At "time 0", Pod A1 (404A) (the "source" pod) receives a valid request from a user of a client, in which the request specifies metadata and/or data. In response to receiving the request (and the associated metadata and/or data), as part of that request, and/or in any other manner, Pod A1 (404A) identifies, via Service B's (412) permanent IP address, a network port of Service B (412) to connect to Service B (412). Upon identifying, Pod A1 (404A) connects (indicated by ①) to the port of Service B (412) in order to perform request related operations.

Thereafter, Service B (412) makes a determination that Pod N1 (404N) (e.g., the related local pod) is available. Based on that, Pod A1 (404A) receives a notification (from Service B (412)) indicating that Service B (412) is ready to receive internal network traffic (e.g., at least the metadata and/or data). Upon being informed, Pod A1 (404A) sends the internal network traffic to Service B (412). Based on its service internal traffic policy, Service B (412) routes (indicated by ②) the internal network traffic to Pod A1 (404A) to manage the internal network traffic.

Turning now to FIG. 4.2, FIG. 4.2 shows a diagram of the example internal network traffic at "time 1", which is after "time 0". For the sake of brevity, not all components involved in the example internal network traffic may be discussed in FIG. 4.2.

Assume here that all pods (discussed above in reference to FIG. 4.1) are available, except Pod N1 (404N) (which becomes "offline", indicated by dash dot lines).

At "time 1", Pod A1 (404A) receives a second valid request from the user, in which the request specifies second data. In response to receiving the second request (and the second data), as part of that second request, and/or in any other manner, Pod A1 (404A) connects (indicated by ③) to the port of Service B (412) in order to perform request related operations.

Thereafter, Service B (412) makes a determination (indicated by ④) that Pod N1 (404N) is not available (e.g., down). Based on that, Pod A1 (404A) receives (indicated by ⑤) a second notification (from Service B (412)) indicating that Service B (412) is not ready to receive second internal network traffic (e.g., at least the second data).

Turning now to FIG. 4.3, FIG. 4.3 shows a diagram of the example internal network traffic at "time 1". For the sake of brevity, not all components involved in the example internal network traffic may be discussed in FIG. 4.3.

Upon being informed, Pod A1 (404A), Pod A1 (404A) identifies, via Service A's (410) permanent IP address, a network port of Service A (410) to connect to Service A (410). Upon identifying, Pod A1 (404A) connects (indicated by ⑥) to the port of Service A (410) in order to perform request related operations.

Thereafter, Pod A1 (404A) sends the second internal network traffic to Service A (410). Based on its service internal traffic policy, Service A (410) routes (indicated by ⑦) the second internal network traffic to Pod N2 (406N) to manage the second internal network traffic.

End of Example

Turning now to FIG. 5, FIG. 5 shows a diagram of a computing device in accordance with one or more embodiments of the invention.

In one or more embodiments of the invention, the computing device (500) may include one or more computer processors (502), non-persistent storage (504) (e.g., volatile memory, such as RAM, cache memory), persistent storage (506) (e.g., a non-transitory computer readable medium, a hard disk, an optical drive such as a CD drive or a DVD drive, a Flash memory, etc.), a communication interface (512) (e.g., Bluetooth interface, infrared interface, network interface, optical interface, etc.), an input device(s) (510), an output device(s) (508), and numerous other elements (not shown) and functionalities. Each of these components is described below.

In one or more embodiments, the computer processor(s) (502) may be an integrated circuit for processing instructions. For example, the computer processor(s) (502) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (e.g., a LAN, a WAN, Internet, mobile network, etc.) and/or to another device, such as another computing device.

In one or more embodiments, the computing device (500) may include one or more output devices (508), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing network traffic, the method comprising:
   identifying, by a source pod, a port of a first service, wherein the first service implements a protocol;
   in response to the identifying the port of the first service, connecting, by the source pod, to the port of the first service;
   receiving, by the source pod, a first notification from the first service,
     wherein the first notification specifies that the first service is not ready to receive network traffic and a first target pod is unavailable,
     wherein, after performing a first determination that the first target pod is unavailable, the first service sends the first notification to the source pod;
   after the first notification:
     identifying, by the source pod, a port of a second service;
     in response to the identifying the port of the second service, connecting, by the source pod, to the port of the second service;
     receiving, by the source pod, a second notification from the second service,
       wherein the second notification specifies that the second service is ready to receive the network traffic and a second target pod is available,
       wherein, after performing a second determination that the second target pod is available, the second service sends the second notification to the source pod,
       wherein the source pod, the first target pod, and the second target pod are not aware of each other; and
     upon receiving the second notification, sending, by the source pod, the network traffic to the second service, wherein the second service routes the network traffic to the second target pod.

2. The method of claim 1,
   wherein a first node hosts the source pod and the first target pod,
   wherein a second node hosts the second target pod, and
   wherein the first node and the second node are distinct computing devices operably connected to each other over the first service and the second service.

3. The method of claim 2,
   wherein the first node comprises at least first hardware resources, wherein the first hardware resources comprise a central processing unit (CPU), a graphics processing unit (GPU), a data processing unit (DPU), a memory, a network resource, and a storage resource, and
   wherein the second node comprises at least a second hardware resource that is distinct from the first hardware resources.

4. The method of claim 1,
   wherein the network traffic comprises at least deduped file system metadata that is generated by the source pod after receiving a request from a user, and
   wherein, after receiving, the second target pod stores the deduped file system metadata.

5. The method of claim 4,
   wherein the first target pod is local to the source pod, and
   wherein the second target pod is remote to the source pod and the first target pod.

6. The method of claim 5,
   wherein the first service implements a first traffic policy in order to route second network traffic of the source pod only to the first target pod, and
   wherein the second service implements a second traffic policy in order to route the second network traffic of the source pod to the first target pod or the second target pod.

7. The method of claim 6, wherein the second service implements the protocol, wherein the protocol is a transmission control protocol (TCP).

8. The method of claim 5, wherein the source pod comprises a plurality of containers.

9. A non-transitory computer readable medium (CRM) comprising computer readable program code, which when executed by a computer processor enables the computer processor to perform a method for managing network traffic, the method comprising:
identifying, by a source pod, a port of a first service, wherein the first service implements a protocol;
in response to the identifying the port of the first service, connecting, by the source pod, to the port of the first service;
receiving, by the source pod, a first notification from the first service,
wherein the first notification specifies that the first service is not ready to receive network traffic and a first target pod is unavailable,
wherein, after performing a first determination that the first target pod is unavailable, the first service sends the first notification to the source pod;
after the first notification:
identifying, by the source pod, a port of a second service;
in response to the identifying the port of the second service, connecting, by the source pod, to the port of the second service;
receiving, by the source pod, a second notification from the second service,
wherein the second notification specifies that the second service is ready to receive the network traffic and a second target pod is available,
wherein, after performing a second determination that the second target pod is available, the second service sends the second notification to the source pod,
wherein the source pod, the first target pod, and the second target pod are not aware of each other; and
upon receiving the second notification, sending, by the source pod, the network traffic to the second service, wherein the second service routes the network traffic to the second target pod.

10. The CRM of claim 9,
wherein a first node hosts the source pod and the first target pod,
wherein a second node hosts the second target pod, and
wherein the first node and the second node are distinct computing devices operably connected to each other over the first service and the second service.

11. The CRM of claim 10,
wherein the first node comprises at least first hardware resources, wherein the first hardware resources comprise a central processing unit (CPU), a graphics processing unit (GPU), a data processing unit (DPU), a memory, a network resource, and a storage resource, and
wherein the second node comprises at least a second hardware resource that is distinct from the first hardware resources.

12. The CRM of claim 9,
wherein the network traffic comprises at least deduped file system metadata that is generated by the source pod after receiving a request from a user, and
wherein, after receiving, the second target pod stores the deduped file system metadata.

13. The CRM of claim 12,
wherein the first target pod is local to the source pod, and wherein the second target pod is remote to the source pod and the first target pod.

14. The CRM of claim 13,
wherein the first service implements a first traffic policy in order to route second network traffic of the source pod only to the first target pod, and
wherein the second service implements a second traffic policy in order to route the second network traffic of the source pod to the first target pod or to the second target pod.

15. The CRM of claim 14, wherein the second service implements the protocol, wherein the protocol is a user datagram protocol (UDP).

16. A system comprising:
a first worker node manager that manages a second target pod;
a second worker node manager that manages a source pod and a first target pod, wherein the source pod comprises a memory and a processor coupled to the memory, wherein the processor is configured to execute a method for managing network traffic, the method comprising:
identifying, by a source pod, a port of a first service, wherein the first service implements a protocol;
in response to the identifying the port of the first service, connecting, by the source pod, to the port of the first service;
receiving, by the source pod, a first notification from the first service,
wherein the first notification specifies that the first service is not ready to receive network traffic and a first target pod is unavailable,
wherein, after performing a first determination that the first target pod is unavailable, the first service sends the first notification to the source pod;
after the first notification:
identifying, by the source pod, a port of a second service;
in response to the identifying the port of the second service, connecting, by the source pod, to the port of the second service;
receiving, by the source pod, a second notification from the second service,
wherein the second notification specifies that the second service is ready to receive the network traffic and a second target pod is available,
wherein, after performing a second determination that the second target pod is available, the second service sends the second notification to the source pod,
wherein the source pod, the first target pod, and the second target pod are not aware of each other; and
upon receiving the second notification, sending, by the source pod, the network traffic to the second service, wherein the second service routes the network traffic to the second target pod.

17. The system of claim 16,
wherein a first node hosts the source pod and the first target pod,
wherein a second node hosts the second target pod, and
wherein the first node and the second node are distinct computing devices operably connected to each other over the first service and the second service.

18. The system of claim 17,
wherein the first node comprises at least first hardware resources, wherein the first hardware resources comprise a central processing unit (CPU), a graphics processing unit (GPU), a data processing unit (DPU), a memory, a network resource, and a storage resource, and wherein the second node comprises at least a second hardware resource that is distinct from the first hardware resources.

19. The system of claim 18, wherein the network traffic comprises at least deduped file system metadata that is generated by the source pod after receiving a request from a user, and wherein, after receiving, the second target pod stores the deduped file system metadata.

20. The system of claim 19, wherein the first target pod is local to the source pod, and wherein the second target pod is remote to the source pod and the first target pod.

* * * * *